(12) United States Patent
Kitajima

(10) Patent No.: US 6,957,788 B2
(45) Date of Patent: Oct. 25, 2005

(54) SOUND GENERATING MECHANISM FOR A FISHING REEL

(75) Inventor: Keigo Kitajima, Sakai (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 10/811,964

(22) Filed: Mar. 30, 2004

(65) Prior Publication Data
US 2004/0206840 A1 Oct. 21, 2004

(30) Foreign Application Priority Data

| Apr. 16, 2003 | (JP) | ..................................... 2003-111447 |
| May 30, 2003 | (JP) | ..................................... 2003-154603 |
| May 15, 2003 | (JP) | ..................................... 2003-137379 |

(51) Int. Cl.7 ............................................. A01K 89/02
(52) U.S. Cl. ..................................... 242/307; 242/245
(58) Field of Search ................................. 242/305–307, 242/245–246

(56) References Cited

U.S. PATENT DOCUMENTS

| 4,634,074 A | 1/1987 | Ohmori |
| 4,832,279 A | 5/1989 | Maruyama |
| 4,988,057 A * | 1/1991 | Hitomi ........................ 242/245 |
| 5,279,477 A * | 1/1994 | Yoshikawa .................. 242/306 |
| 5,855,328 A | 1/1999 | Hitomi |
| 6,578,785 B1 * | 6/2003 | Hong ......................... 242/245 |

FOREIGN PATENT DOCUMENTS

| EP | 1329157 A | 7/2003 |
| JP | 2-5739 U | 8/1984 |

* cited by examiner

Primary Examiner—Emmanuel Marcelo
(74) Attorney, Agent, or Firm—Shinjyu Global IP Counselors, LLP

(57) ABSTRACT

A sound generating mechanism 60 includes a sounding member 61, a retaining member 62, a sounding pin 64, and a coil spring 65. The sounding member 61 includes a disk portion 61a formed into a ring shape, a plurality of sounding concavities 61b formed circumferentially apart on the disk portion 61a, and engagement portions 61c integrally formed with the disk portion 61a. The retaining member 62 prevents the sounding member 61 from falling off. The sounding pin 64 is mounted in the knob member 56 at a position opposite at least one of the sounding concavities 61b so as to be movable toward and away from the sounding concavities 61b. The coil spring 65 urges the sounding pin 64 toward the sounding concavities 61b. The sounding pin 64 is unlikely to fall off when the knob member 56 is attached to or removed from the knob mounting portion 52.

20 Claims, 15 Drawing Sheets

SOUND GENERATING MECHANISM FOR A FISHING REEL

BACKGROUND OF THE INVENTION

1. Field of the Invention

The present invention relates to a sound generating mechanism. More particularly the present invention relates to a sound generating mechanism for a fishing reel that is disposed between a tubular knob mounting portion that is arranged on a reel unit of the fishing reel and a closed end tubular knob member that is rotatively mounted on the knob mounting portion, the sound generating mechanism generating sound by the relative rotation of the knob mounting portion and the knob member.

2. Background Information

For example, in a conventional spinning reel, a rear drag sound generating mechanism is disposed between a tubular knob mounting portion that is arranged on a rear portion of a reel unit of the spinning reel, and a closed end tubular member that is rotatively mounted on the knob mounting portion. A sounding leaf is mounted on the reel unit with this type of sound generating mechanism. The sounding leaf is formed into an approximate L-shape, and includes a vertical portion and a horizontal portion. The vertical portion of the sounding leaf is mounted on an upper portion of a rear end wall of the reel unit. The horizontal portion of the sounding leaf is disposed along an upper surface of the knob mounting portion on the rear portion of the reel unit. The tip of the horizontal portion engages with corrugated portions formed on an inner peripheral surface of the knob member. In this way, when the knob member is rotated relative to the knob mounting portion, the tip of the horizontal portion will repeatedly strike the corrugated portions of the knob member to generate sound. See, for example, FIGS. 1 and 2 of Japanese Utility Model No. H02-5739.

For example, in a conventional rear drag sound generating mechanism for a spinning reel, when the knob member is rotated, it will be difficult to obtain good crisp clicking sounds when the sounds are produced by the sounding leaf engaged with the corrugated portions of the knob member. Accordingly, it has been conceived to mount an urging means and a sounding pin employed in front drag sound generating mechanisms on the knob member in order to obtain good crisp clicking sounds. However, the sounding pin and the urging means may fall off of the knob member depending on the posture of the knob member at the time the sounding pin and the urging means are mounted on the knob mounting portion. For example, when the bottom portion of the knob member is in a downward posture, it will be difficult for the sounding pin and the urging means disposed on the knob member to fall off if the knob member is mounted to the knob mounting portion from below. However, if the bottom portion of the knob member is not placed in a downward posture, there will be times in which the sounding pin and the urging means will fall off therefrom. In addition, if one attempts to remove the knob member from the knob mounting portion for maintenance or the like, the sounding pin may fall off the knob member due to the urging force of the urging means.

In view of the above, it will be apparent to those skilled in the art from this disclosure that there exists a need for an improved rear drag sound generating mechanism that overcomes above-described problems. This invention addresses this need in the art as well as other needs, which will become apparent to those skilled in the art from this disclosure.

SUMMARY OF THE INVENTION

An object of the present invention is to obtain good crisp clicking sounds in a sound generating mechanism for a fishing reel, while keeping the sounding pin from falling off when the knob member is attached or removed.

A sound generating mechanism for a fishing reel according to the first aspect of the present invention is disposed between a tubular knob mounting portion that is arranged on a reel unit of the fishing reel and a closed end tubular knob member that is rotatively mounted on the knob mounting portion. The sound generating mechanism generates sounds by a relative rotation between the knob mounting portion and the knob member, and includes a sounding member, a retaining member, a sounding pin, and urging means. The sounding member is adapted to be rotatively mounted to an engagement portion of the knob member and be non-rotative with respect to the knob mounting portion. The sounding member has a disk portion that is formed into a ring shape and a plurality of sounding concavities that are formed circumferentially apart on the disk portion. The retaining member is arranged in order to prevent the sounding member from falling out. The mounting recess is adapted to be mounted to the knob member such that the sounding member is sandwiched between the retaining member and the engagement portion of the knob member. The sounding pin is mounted to the engagement portion of the knob member at a position opposite at least one of the plurality of sounding concavities. The sounding pin is mounted so as to be movable toward and away from the plurality of sounding concavities. The urging means is mounted to the engagement portion of the knob member for urging the sounding pin toward the plurality of sounding concavities.

The sound generating mechanism for a fishing reel is disposed between a tubular knob mounting portion that is arranged on a reel unit of the fishing reel, and a closed end tubular member that is rotatively mounted on the knob mounting portion. The sounding pin and the urging means are mounted in the engagement portion of the knob member. The sounding member is rotatively mounted on the engagement portion of the knob member. The urging means urges the sounding pin toward the sounding concavities of the sounding member, and engages the sounding pin toward the sounding concavities. In this state, the retaining member is disposed on the knob member in order to prevent the sounding member from falling out. Then, the sounding member is non-rotatively mounted on the knob mounting portion.

Here, good crisp clicking sounds can be obtained when the knob member is rotated because the sounding pin mounted in the mounting recess of the knob member is engaged with the sounding concavities of the sounding member due to the operation of the urging means. In addition, because the sounding member is mounted to the knob member in a state in which the sounding pin is engaged with one of the sounding concavities of the sounding member, and the sounding member is retained by the retaining member, it will be difficult for the sounding member and the urging means to fall out from the knob member regardless of the posture that the knob member has when one attempts to mount the knob member to the knob mounting portion. Furthermore, even when one attempts to remove the knob member from the knob mounting portion, it will be difficult for the sounding pin to fall out from the knob member because the sounding member retained by the retaining member restricts the fall off of the sounding pin from the knob member.

A sound generating mechanism for a fishing reel according to the second aspect of the present invention is the sound generating mechanism for a fishing reel as set forth in the first aspect, in which the sounding pin and the urging means are adapted to be mounted in a mounting recess formed on the engagement portion of the knob member.

A sound generating mechanism for a fishing reel according to the third aspect of the present invention is the sound generating mechanism for a fishing reel as set forth in the first or second aspect, in which the sounding pin has a smooth convex head portion, a mounting portion that is connected to the head portion and has a diameter that is larger than a diameter of the head portion, and a shaft portion that is connected to the mounting portion and has a diameter that is smaller than the diameter of the mounting portion. Here, the urging means is disposed on the outer periphery of the shaft portion, and one end of the urging means is brought into contact with the engagement portion at one end is with the mounting portion at the other end. In this way, the sounding pin is urged toward the sounding concavities. Because the head portion of the sounding pin has a diameter that is smaller than that of the mounting portion, the gaps between the sounding concavities can be reduced, and the sound generating gaps can produce short precise clicking sounds.

A sound generating mechanism for a fishing reel according to the fourth aspect of the present invention is the sound generating mechanism for a fishing reel disclosed in any of the first through third aspects, the retaining member is adapted to be mounted on an inner peripheral surface of the knob member. Here, the retaining member is mounted so that it can urge the inner peripheral surface of the knob member in the radially outward direction, and thus the retaining member can be easily mounted on the inner peripheral surface of the knob member. Accordingly, the removal of the sounding member from the knob member can be restricted by the retaining member.

A sound generating mechanism for a fishing reel according to the fifth aspect of the present invention is the sound generating mechanism for a fishing reel disclosed in any of the first through fourth aspects, in which the retaining member is mounted in an annular engagement groove that has a diameter larger than an outer diameter of the sounding member and is formed in the inner peripheral surface of the knob member. Here, the engagement groove is formed in the inner peripheral surface of the knob member, and the retaining member is mounted in the engagement groove. Thus, the retaining member can be easily positioned and mounted on the knob member. The removal of the sounding member from the knob member can be reliably restricted by the retaining member.

A sound generating mechanism for a fishing reel according to the sixth aspect of the present invention is the sound generating mechanism for a fishing reel disclosed in any of the first through fifth aspects, in which the retaining member is a C-shaped retaining ring, and an inner diameter of the C-shaped retaining ring is smaller than an outer diameter of the sounding member. Here, the retaining member is a C-shaped retaining ring, and thus the retaining member can be easily mounted on the knob member. In addition, the inner diameter of the C-shaped retaining ring is smaller than the outer diameter of the sounding member, and thus the sounding member will not fall off of the knob member.

A sound generating mechanism for a fishing reel as set forth in the seventh aspect is the sound generating mechanism for a fishing reel disclosed in any of inventions the first through sixth aspects, in which a plurality of engagement recesses are formed circumferentially apart in the knob mounting member, and the sounding member has a plurality of protruding portions that are integrally formed on the disk portion and project toward the engagement recesses of the knob mounting member. The plurality of protruding portions non-rotatively engages with the engagement recesses of the knob mounting member. Here, the engagement recesses formed in the knob mounting portion and the protruding portions of the sounding member engage with each other, and thus the sounding member can be easily positioned and non-rotatively mounted on the knob mounting portion.

A sound generating mechanism for a fishing reel as set forth in the eighth aspect is the sound generating mechanism for a fishing reel disclosed in any of the first through seventh aspects, in which the urging means includes a coil spring that is disposed on the outer periphery of the sounding pin. Here, the coil spring is disposed on the outer periphery of the sounding pin, and one end of the coil spring is brought into contact with the engagement of the knob member when the coil spring is in the compressed state. The sounding pin is urged toward the sounding concavities of the sounding member and engages with the sounding concavities due to the urging force of the coil spring. When this type of urging means is employed, the jerkiness of the sounding pin can be reduced due to the coil spring, and thus the sounding pin will easily engage with the sounding concavities.

A sound generating mechanism for a fishing reel as set forth in the ninth aspect is the sound generating mechanism for a fishing reel as set forth in the eighth aspect, in which an end portion of the coil spring is engaged with a bottom portion of the mounting recess formed on the engagement portion of the knob member. Here, an end portion of the coil spring is engaged with the bottom portion of the mounting recess, and thus it will be difficult for the coil spring itself to fall out of the mounting recess due to the urging force of the coil spring.

The fishing reel may be a spinning reel that includes a drag mechanism. The knob mounting portion is arranged on a rear portion of the reel unit and accommodates the rear drag mechanism, and drag of the drag mechanism is adjusted when the knob member rotates relative to the knob mounting portion. With this rear drag type reel, the knob mounting portion that serves to accommodate the rear drag mechanism is arranged on the rear portion of the reel unit, and first and second knob members are adjustment members of the rear drag mechanism and are mounted on the knob mounting portion. Here, the sound generating mechanism of, for instance, the fist aspect of the present invention may be arranged on the portion between the knob mounting portion and the knob member, such that the sound generating mechanism can generate sounds by a relative rotation between the knob mounting portion and the knob member. In such case, good crisp clicking sounds can be obtained when the knob member is rotated. Also, it will be difficult for the sounding member and the sounding pin to fall out from the knob member when one attempts to mount and remove the knob member to and from the knob mounting portion.

Alternatively, the fishing reel may be a dual bearing reel that has a control mechanism for braking the spool. The reel unit includes a frame and two side covers that are mounted to both sides of the frame. The knob mounting portion that accommodates the casting control mechanism is arranged to project from one of the side covers of the reel unit. Breaking force of the casting control mechanism is adjusted when the knob member rotates relative to the knob mounting portion. With this rear drag type of spinning reel, the knob mounting portion that accommodates a rotational shaft end of the spool is arranged to project from a side surface of the reel unit. First and second knob members are adjustment members of the casting control mechanism and are mounted on the knob mounting portion. Here, the sound generating mechanism of, for example, the first aspect of the present invention may be is arranged between the knob mounting portion and the knob member, such that the sound generating mechanism can generates sounds by a relative rotation between the knob mounting portion and he knob member. In such case of, good crisp clicking sounds can be obtained when the knob member is rotated. Also, it will be difficult for the sounding member and the sounding pin to fall out from the knob member when one attempts to mount and remove the knob member to and from the knob mounting portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
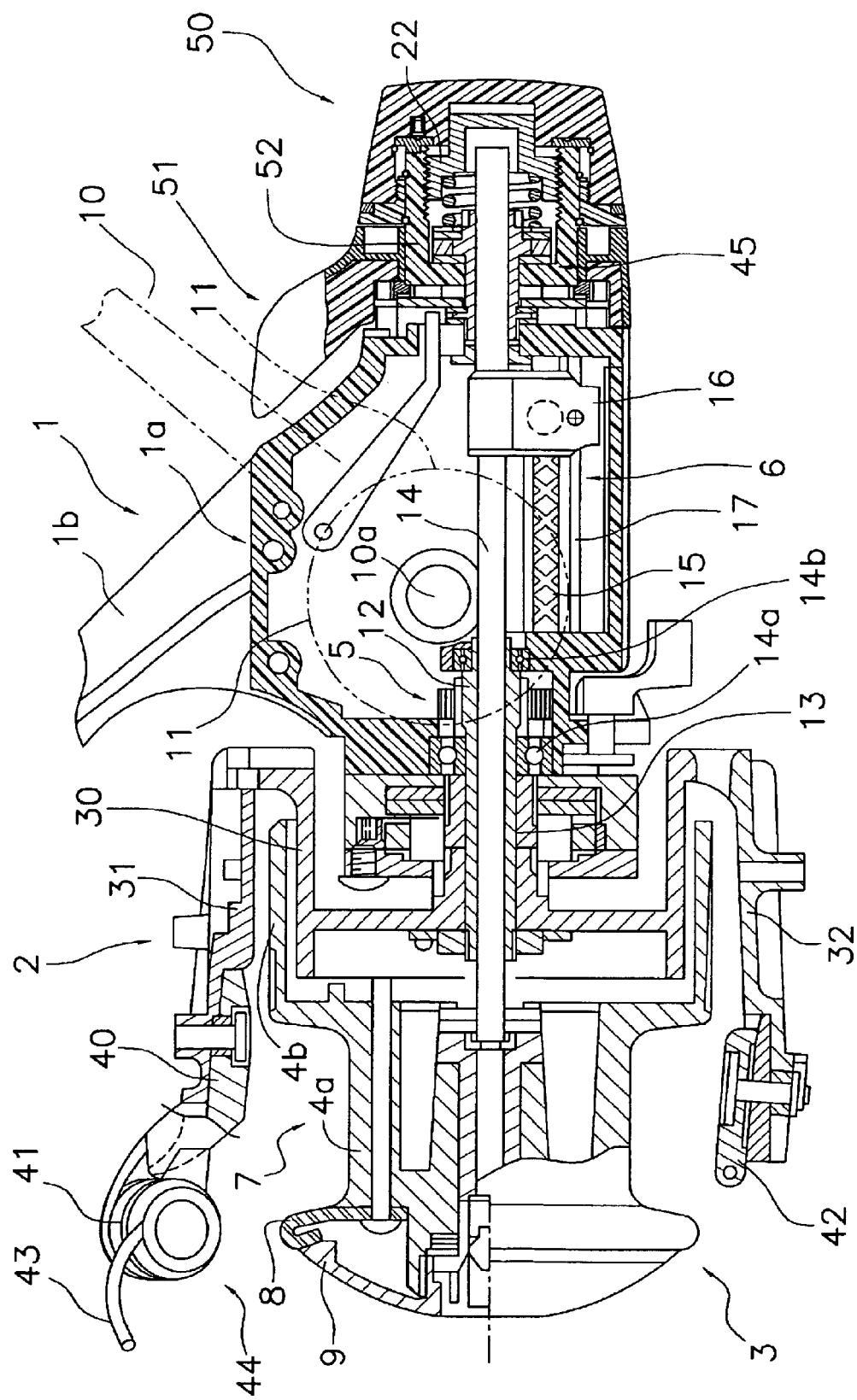
FIG. 1 is a cross sectional view of a spinning reel according to a first embodiment of the present invention.

FIG. 1 shows a spinning reel according to an embodiment of the present invention.

First Embodiments

Structure of the Spinning Reel

FIG. 1 shows a spinning reel according to a first embodiment of the invention.

As shown in FIG. 1, the spinning reel primarily includes a reel unit 1 that rotatively supports a handle 10, a rotor 2, a spool 3, a first drag knob 50, and a second drag knob 51.

Reel Unit 1

Figure 2:
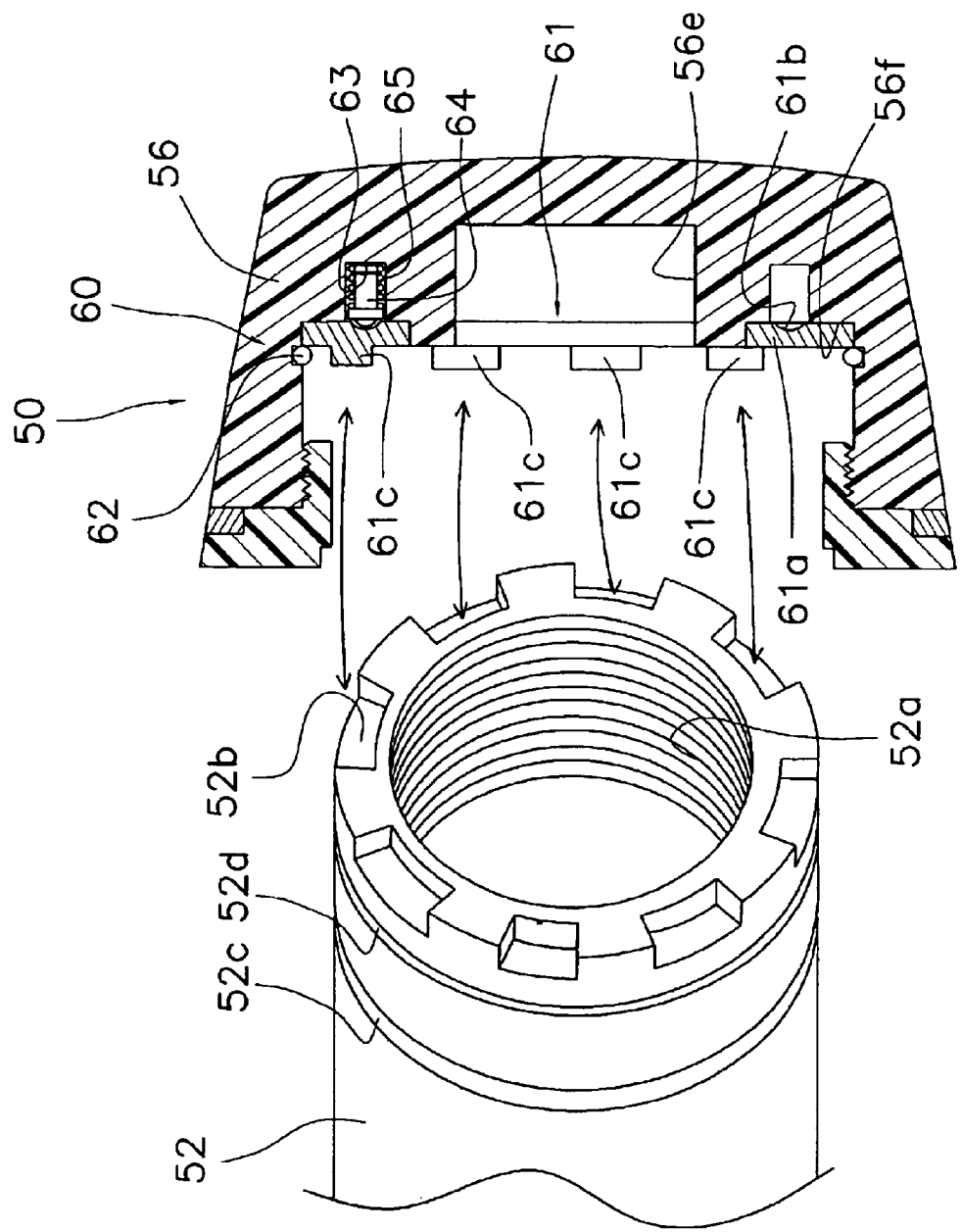
FIG. 2 is a schematic view of a knob mounting portion of the spinning reel and a cross sectional view of a first drag knob according to the first embodiment of the present invention.

The reel unit 1 includes a reel body 1a, and a rod attachment leg 1b that extends diagonally upward and forward from the reel body 1a. An accommodation space is formed in the interior of the reel body 1a. A rotor drive mechanism 5 that rotates the rotor 2 in conjunction with the rotation of the handle 10, and an oscillating mechanism 6 that moves the spool 3 back and forth to uniformly wind fishing line are arranged inside the accommodation space. A knob mounting portion 52 is formed into a tubular shape and is integrally with the rear portion of the reel body 1a as a one-piece unitary member, with members such as a second pressure member 25 being disposed in a slit formed in between the knob mounting portion 52 and the reel body 1a. As shown in FIG. 2, a first female threaded portion 52a is formed on the rear inner peripheral surface of the knob mounting portion 52. In addition, a plurality of engagement recesses 52b that are formed circumferentially apart from each other at a fixed distance are arranged on a rear end surface of the knob mounting portion 52. Furthermore, first and third engagement grooves 52c, 52d are formed in the outer peripheral surface of the knob mounting portion 52.

Rotor 2

As shown in FIG. 1, the rotor 2 is rotatively supported on a front portion of the reel unit 1. The rotor 2 includes a rotor cylindrical portion 30, and a first rotor arm 31 and a second rotor arm 32. The first and second rotor arms 31, 32 are arranged at mutually opposing positions of the rotor cylindrical portion 30. The rotor cylindrical portion 30 and the first and second rotor arms 31, 32 are, for example, made of an aluminum alloy, and are integrally formed as a one-piece unitary unit. The first and second rotor arms 31, 32 are connected to the upper circumferential surface of the rotor cylindrical portion 30 and spread outward in the circumferential direction. The first and second rotor arms 31, 32 project outward from the rotor cylindrical portion 30 and then curve and extend forward. A first bail support member 40 is pivotably mounted to the front end of the first rotor arm 31. A line roller 41 for guiding fishing line to the spool 3 is mounted to the front end of the first bail support member 40. A second bail support member 42 is pivotably mounted to the front end of the second rotor arm 32. A bail 43 that is a wire member curved into an approximate U-shape is fixedly held between the line roller 41 and the second bail support member 42. The first bail support member 40, the second bail support member 42, the line roller 41, and the bail 43 form a bail arm 44 that guides the fishing line onto the spool 3. The bail arm 44 can pivot between a line-guiding posture shown in FIG. 1 and a line-releasing posture which is a position opposite the line-guiding posture.

The rotor 2 is a conventional component that is well known in the art. Accordingly, its structure and function will not be discussed or illustrated in detail herein.

Rotor Drive Mechanism 5

As shown in FIG. 1, the rotor drive mechanism 5 includes a face gear 11 and a pinion gear 12. The face gear 11 rotates together with a handle shaft 10a that is connected to the handle 10, and the pinion gear 12 meshes with the face gear 11. The pinion gear 12 is formed into a tubular shape, and a front portion of the pinion gear 12 extends toward the spool 3 and passes through the center of the rotor 2. The middle and the rear end portions of the pinion gear 12 in the axial direction are rotatively supported by the reel unit 1 via bearings 14a, 14b, respectively. A spool shaft 14 passes through the center of the pinion gear 12, and slidably moves forward and backward along the rotational axis of the pinion gear 12. Chamfered portions 13 that are chamfered in a parallel manner with a predetermined length are formed on the front portion of the pinion gear 12. The chamfered portions 13 serve to non-rotatively connect the rotor 2 with the pinion gear 12.

The rotor drive mechanism 5 is a conventional component that is well known in the art. Accordingly, its structure and function will not be discussed or illustrated in detail herein.

Spool 3

The spool 3 winds fishing line around the outer peripheral surface thereof as the handle 10 rotates, and is mounted on the front portion of the rotor 2 as shown in FIG. 1, so that the spool 3 can be shifted front and rear. The spool 3 includes a spool unit 7, a brim 8, and a brim fixing member 9. The spool unit 7 includes a bobbin portion 4a and a skirt portion 4b. The bobbin portion 4a is formed into a tubular shape so that the fishing line can be wound around the outer periphery thereof. The skirt portion 4b is formed such that its diameter is larger than the outer diameter of the bobbin portion 4a, and is integrally formed as a one-piece unitary member with the rear portion of the bobbin portion 4a. The brim 8 is mounted on the front portion of the bobbin portion 4a, and is fixedly coupled to the spool unit 7 by the bobbin fixing member 9.

The spool 3 is a conventional component that is well known in the art. Accordingly, its structure and function will not be discussed or illustrated in detail herein.

Oscillating Mechanism 6

As shown in FIG. 1, the oscillating mechanism 6 is a device that causes the spool shaft 14 connected to the spool 3 to move front and rear, and causes the spool 3 to move accordingly. The oscillating mechanism 6 includes a worm 15 disposed below and parallel to the spool shaft 14, a slider 16 that moves front and rear along the worm 15, a guide shaft 17 that is disposed below the worm 15, and an intermediate gear (not shown in the figures) that is fixedly coupled to the front end of the worm 15. The slider 16 is non-rotatively mounted to the spool shaft 14, and the guide shaft 17 is disposed in parallel with the spool shaft 14.

The oscillating mechanism 6 is a conventional component that is well known in the art. Accordingly, its structure and function will not be discussed or illustrated in detail herein.

Rear Drag Mechanism 45

Figure 3:
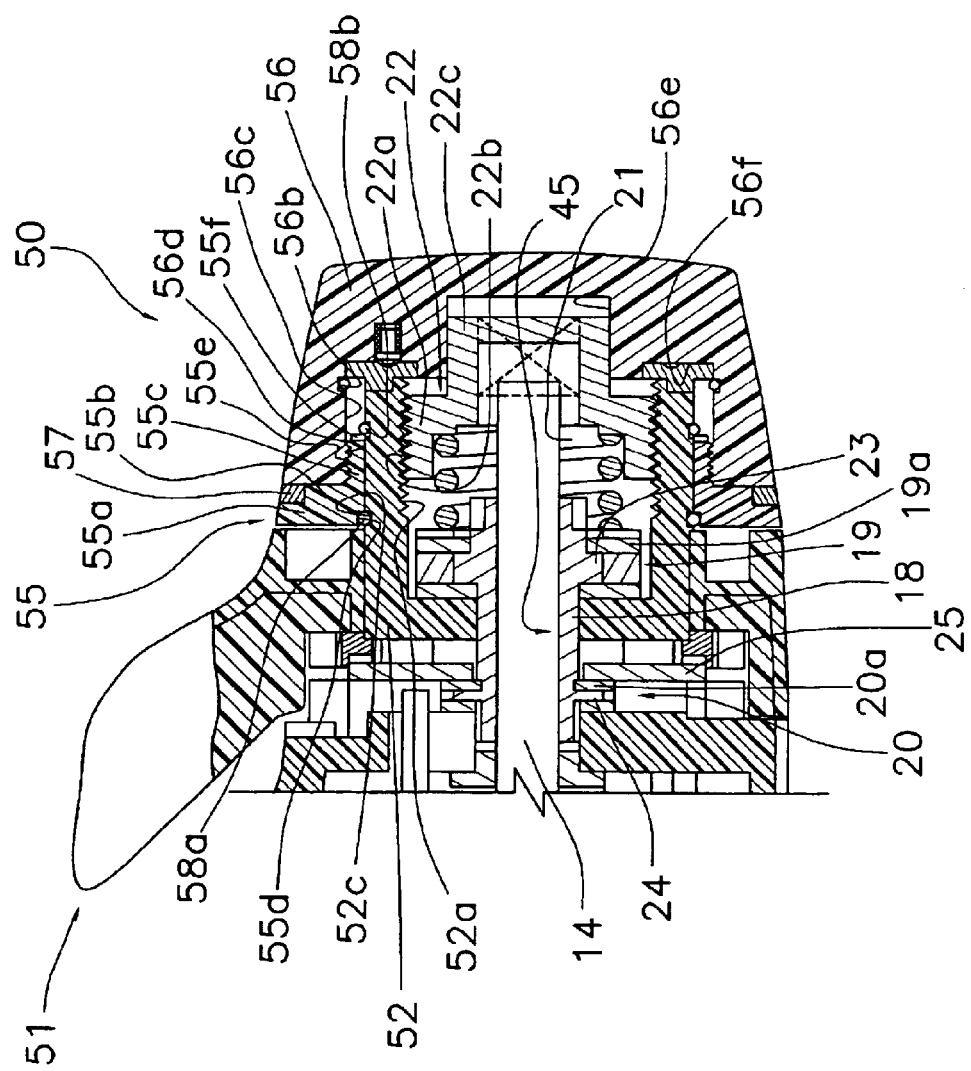
FIG. 3 is an enlarged cross sectional view of the rear portion of the spinning reel according to the first embodiment of the present invention.

The rear drag mechanism 45 is a mechanism that causes a drag force to be applied to the spool 3. As shown in FIG. 3, the rear drag mechanism 45 is housed inside the knob mounting portion 52 and includes a cylindrical bush 18, first and second friction engagement portions 19, 20 that include a plurality of friction plates 19a, 20a, a coil spring 21, a first pressure member 22 for urging the friction plates 19a of the first friction engagement portion 19, and a second pressure member 25 for urging the friction plates 20a of the second friction engagement portion 20.

The bush 18 is formed into a cylindrical shape, and inserted around the outer periphery of the rear portion of the spool shaft 14. The spool shaft 14 is non-rotative and slidable with respect to the bush 18. A first flange portion 23 is arranged on the outer peripheral surface of the rear portion of the bush 18, and a second flange portion 24 is arranged on the outer peripheral surface of the front portion of the bush 18. The friction plates 19a, 20a of the first and second friction engagement portions 19, 20 are respectively disposed on the first and second flange portions 23, 24. The coil spring 21 is disposed on the rear portion of the first friction engagement portion 19. The first pressure member 22 is connected in series with the rear portion of the coil spring 21. A front portion 22a of the first pressure member 22 is formed into a cylindrical shape, and a first male threaded portion 22b is arranged on the outer peripheral surface of the front portion 22a. In addition, a rear portion 22c of the first pressure member 22 is formed into a closed-end tubular shape having a diameter that is smaller than that of the front portion 22a of the first pressure member 22. The outer peripheral surface of the rear portion 22c has two chamfered portions that are parallel to each other.

The first male threaded portion 22b of the first pressure member 22 is rotatively mounted on the first female threaded portion 52a formed in the inner peripheral surface of the knob mounting member 52. When the first pressure member 22 rotates in this state, the first pressure member 22 rotates in the interior of the knob mounting portion 52 while moving frontward and rearward, and compresses and decompresses the coil spring 21 accordingly. The second pressure member 25 is disposed on the rear portion of the second friction engagement portion 20. The rear drag mechanism 45 structured as described above will adjust the drag force via the first drag knob 50 and the second drag knob 51.

As shown in FIG. 3, the first drag knob 50 includes a first knob member 55, a second knob member 56, and a ring member 57. The first knob member 55 is, for example, made of a synthetic resin, and is formed into a tubular shape. The first knob member 55 includes a first tubular portion 55a, a second tubular portion 55b, and a third tubular portion 55c. The first to third tubular portions 55a, 55b, 55c are formed integrally as a one-piece unitary member.

An annular second engagement groove 55d is arranged on the inner peripheral surface of the first tubular portion 55a. A first engagement member (an example of a retaining member) 58a is disposed in the second engagement groove 55d and the first engagement groove 52c of the knob mounting portion 52. Here, for example, an O-ring is employed as the first engagement member 58a. The second tubular portion 55b is integrally formed with the rear end of the first tubular portion 55a, and the outer diameter of the second tubular portion 55b is smaller than the outer diameter of the first tubular portion 55a. The third tubular portion 55c is integrally formed with the rear end of the second tubular portion 55b, and the outer diameter of the third tubular portion 55c is smaller than the outer diameter of the second tubular portion 55c. In addition, a second male threaded portion 55e is arranged on the outer peripheral surface of the third tubular portion 55c. Note that by placing a washer 55f in contact with the rear end surface of the third tubular portion 55c, the rear end portion of the third tubular portion 55c is reinforced. A second engagement member (an example of a retaining member) 58b is disposed on the rear portion of the washer 55f, in the third engagement groove 52d which is formed in the knob mounting portion 52. Here, for example, a C-shaped retaining ring is employed as the second engagement member 58b.

The forward movement of first knob member 55 as described above is regulated with respect to the knob mounting portion 52 by the first engagement member 58a. The rear portion of the first knob member 55 is positioned by the second engagement member 58b via the washer 55f. In this way, the first knob member 55 is rotatively mounted on the knob mounting portion 52 and non-movable in the axial direction.

The second knob member 56 is, for example, made of a synthetic resin, and is formed into a closed-end tubular shape. First and second engagement portions 56e, 56f are provided on the closed end portion of the second knob member 56. The first engagement portion 56e is formed into an oval-shaped recessed shape at the central portion thereof. The rear portion 22c of the first pressure member 22 has two chamfered portions that are parallel to each other on the outer peripheral surface thereof, and is engaged with the first engagement portion 56e. The rear portion 22c of the first pressure member 22 is non-rotative within the first engagement portion 56e and can slide forward and backward therein. The second engagement portion 56f is a toroidal recessed portion formed in the closed end portion of the second knob member 56. A sounding member 61 (described below) is engaged with the second engagement portion 56f.

An annular engagement groove 56b and a second female threaded portion 56d are arranged on the inner peripheral surface of the second knob member 56. The engagement groove 56b is formed on the closed end side of the second knob member 56, and has a diameter that is larger than the outer diameter of the sounding mechanism 61 described below. The second female threaded portion 56d is formed on the open side of the second knob member 56. The second knob member 56 is non-rotatively connected to the first knob member 55 by screwing the second female threaded portion 56d with the second male threaded portion 55e of the first knob member 55. The ring member 57 is, for example, made of aluminum, and is formed into a ring shape. The ring member 57 is disposed such that the inner peripheral surface thereof is in contact with the outer peripheral surface of the second tubular portion 55b, and is interposed between the first knob member 55 and the second knob member 56.

Figure 4:
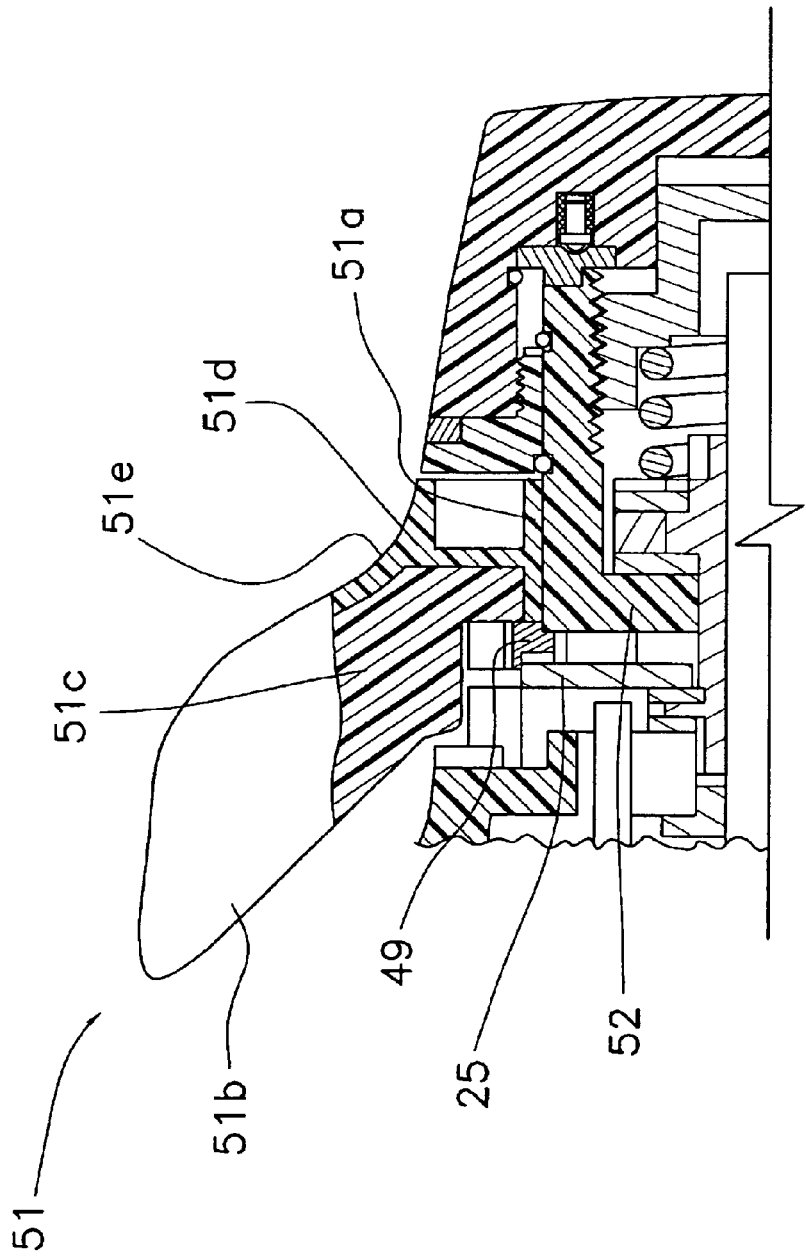
FIG. 4 is an enlarged cross sectional view of a second drag knob of the spinning reel according to the first embodiment of the present invention.

As shown in FIG. 4, the second drag knob 51 includes a cylindrical portion 51a that is formed into a cylindrical shape, and a lever portion 51b that projects outward in the radial direction on the outer peripheral surface of the cylindrical portion 51a and is integrally formed with the cylindrical portion 51a. The inner peripheral surface of the cylindrical portion 51a of the second drag knob 51 is rotatively mounted on the outer peripheral surface of the knob mounting member 52. An engagement member 49 that serves to transmit the movement of the second drag knob 51 to the second pressure member 25 is mounted on the front end portion of the cylindrical portion 51a. The second drag knob 51 is connected to the second pressure member 25 via the engagement member 49.

Here, different materials are respectively employed for a first component unit 51c, a second component unit 51d, and a plate layer 51e of the second drag knob 51. For example, the first component unit 51c is made of a synthetic resin. Then, the second component unit 51d arranged on the surface layer side of the first component unit 51c is made of ABS resin, and the plate layer 51e is plated on the surface layer side of the second component unit 51d. By forming the second drag knob 51 with different materials as described above, shrink marks caused by deviations in thickness can be prevented during the plating process.

The rear drag mechanism 45 is a conventional component that is well known in the art. Accordingly, its structure and function will not be discussed or illustrated in further detail herein.

Rear Drag Sound Generating Mechanism 60

Figure 5:
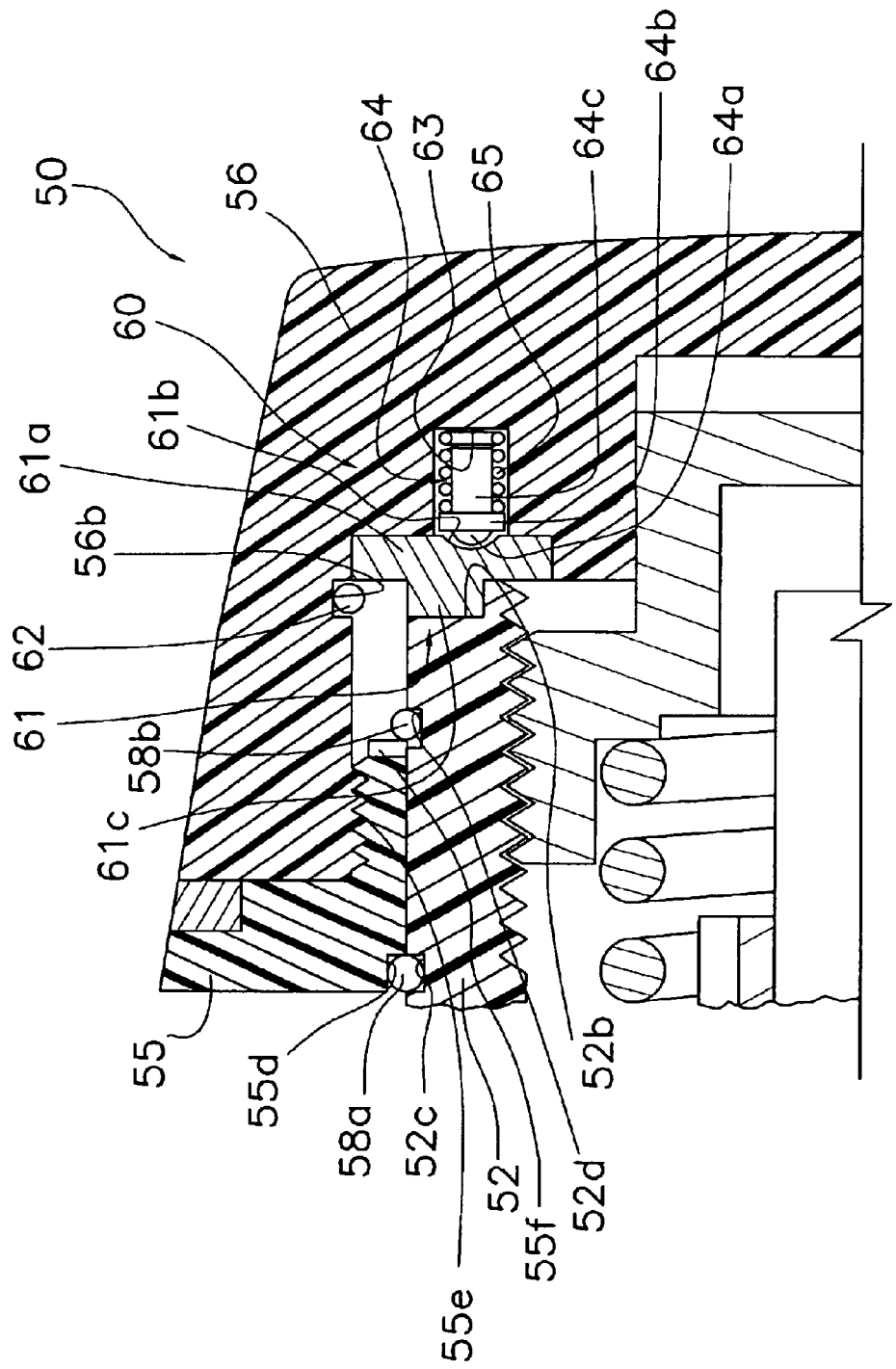
FIG. 5 is an enlarged cross sectional view of a rear drag sound generating mechanism installed on the spinning reel according to the first embodiment of the present invention.

As shown in FIGS. 2 and 5, the rear drag sound generating mechanism 60 is disposed between the knob mounting portion 52 and the second knob member 56, and generates sound by relative rotation between the knob mounting portion 52 and the first drag knob 50. The rear drag sound generating mechanism 60 includes a sounding member 61, a retaining member 62, a mounting recess 63, a sounding pin 64, and a coil spring (an example of urging means) 65.

The sounding member 61 is formed to have a diameter that is smaller than that of the engagement groove 56b, and includes a disk portion 61a that is formed into a ring shape, a plurality of sounding concavities 61b that are disposed circumferentially apart in one surface or the first surface of the disk portion 61a, and engagement portions 61c that are integrally formed with another surface or the second surface of the disk portion 61a. The disk portion 61a of the sounding member 61 fits into the second engagement portion 56f of the second knob member 56. In this state, the sounding member 61 is rotative with respect to the second knob member 56. The engagement portions 61c are formed to project toward the engagement recesses 52b of the knob mounting portion 52. The engagement portions 61c are mounted so that they can be inserted into the engagement recesses 52b formed in the rear end surface of the knob mounting portion 52. The retaining member 62 is arranged in order to prevent the sounding member 61 from falling out. The retaining member 62 is, for example, a C-shaped retaining ring, and is disposed in the engagement groove 56b. The inner diameter of the C-shaped retaining ring 62 is formed to be smaller than the outer diameter of the disk portion 61a, such that the retaining member 62 and the second engagement portion 56f sandwich the disk portion 61a. The mounting recess 63 is formed in the closed end of the second knob member 56, in a position opposite from at least one of the plurality of sounding concavities 61b.

The sounding pin 64 is mounted so that it can move both toward and away from the mounting recess 63. The sounding pin 64 includes a head portion 64a, a mounting portion 64b that is connected to the head portion 64a, and a shaft portion 64c that is connected to the mounting portion 64b. In this embodiment, the head portion 64a is formed such that its front end has a smooth convex shape. The front end of the head portion 64a generates a clicking sound by repeatedly striking the sounding concavities 61b. The mounting portion 64b is formed to have a diameter that is larger than that of the head portion 64a and smaller than the inner diameter of the mounting recess 63. The shaft portion 64c is a shaft shaped component that is formed to have a diameter that is smaller than that of the mounting portion 64b.

The coil spring 65 is disposed around the outer periphery of the shaft portion 64c. Thus, by forming the shaft portion 64c to have a diameter that is smaller than that of the mounting portion 64b, the front end of the coil spring 65 can be brought into contact with the step portion between the mounting portion 64b and the shaft portion 64c. In this state, the base end of the coil spring 65 is mounted on the closed end of the mounting recess 63. The coil spring 65 is accommodated in the mounting recess 63 in the compressed state, and urges the sounding pin 64 toward the sounding concavities 61b.

Operation of the Spinning Reel

When the spinning reel described above is to be used, the bail 43 will be pushed over to the line releasing side when the fishing line is to be reeled out. Then, when the fishing rod is cast, fishing line is reeled out from the spool 3. When the fishing line is to be retrieved, the bail 43 is returned to the line winding side. When the handle 10 is rotated in the line winding direction in this state, this rotational force is transmitted to the pinion gear 12 via the handle shaft 10a and the face gear 11. Then, the rotational force transmitted to the pinion gear 12 rotates the rotor 2, which is coupled to the front portion of the pinion gear 12. In addition, the rotational force transmitted to the pinion gear 12 simultaneously rotates the worm 15 via the intermediate gear (not shown in the figures) that is meshed with the pinion gear 12. When this occurs, the slider 16 that meshes with the spiral grooves of the worm 15 is guided by the guide shaft 17 and moves forward and backward. When the slider 16 moves, the slider 16, the spool shaft 14, and the spool 3 will reciprocate forward and backward. The fishing line guided from the bail 43 and the line roller 41 is uniformly wound forward and backward around the outer periphery of the spool 3 by the rotation of the rotor 2 and the forward and backward movement of the spool 3. When a spinning reel that operates in the above-described manner is used, if a fish is hooked and pulls on the fishing line with a force that exceeds a predetermined drag force, the spool shaft 14 and the spool 3 will rotate relative to each other and the rear drag mechanism 45 will activate. Here, with the rear drag mechanism 45, the drag force is set to a predetermined value with respect to the spool 3 by operating the first drag knob 50 and the second drag knob 51.

When the first drag knob 50 is tightened, the first pressure member 22 inserted into the first engagement portion 56e of the second knob member 56 will rotate while moving forward, and the coil spring 21 connected to the first pressure member 22 will be pushed inward. When this occurs, the surfaces of the plurality of friction plates 19a of the first friction engagement portion 19 will draw near to each other, and the first flange portion 23 of the bush 18 will be interposed between the plurality of the friction plates 19a. Thus, by interposing the first flange portion 23 of the bush 18 between the friction plates 19a, it will be difficult for the spool shaft 14 (that is non-rotative with respect to the bush 18) to rotate, and the drag force applied to the spool 3 will strengthen. On the other hand, when the first drag knob 50 is loosened, the first pressure member 22 will rotate while moving rearward, and the compressed state of the coil spring 21 will be gradually released. When this occurs, the pressure on the first flange portion 23 interposed between the friction plates 19a will be released, it will become easier to rotate the spool shaft 14 (that is non-rotative with respect to the bush 18), and the drag force applied to the spool 3 will weaken.

When the lever portion 51b of the second drag knob 51 is pressed and the second drag knob 51 is tightened, the second pressure member 25 will press on the second friction engagement portion 20 via the engagement member 49. When this occurs, the surfaces of the friction plates 20a of the second friction engagement portion 20 will draw closer to each other, and the second flange portion 24 of the bush 18 will be interposed between the friction plates 20a. Thus, by interposing the second flange portion 24 of the bush 18 between the friction plates 20a, it will be difficult for the spool shaft 14 (that is non-rotative with respect to the bush 18) to rotate, and the drag force applied to the spool 3 will strengthen. On the other hand, when the second drag knob 51 is loosened, the second friction engagement portion 20 will be gradually released from the pressed state by the second pressure member 25. When this occurs, the spool shaft 14 (that is non-rotative with respect to the bush 18) will become easier to rotate, and the drag force of the spool 3 will weaken.

Assembly and Operation of the Rear Drag Sound Generating Mechanism

In order to assemble the rear drag sound generating mechanism 60, the sounding pin 64 and the coil spring 65 are first disposed in the mounting recess 63 of the second knob member 56. Then, with the head portion 64a of the sounding pin 64 in a state in which it is in contact with one of the sounding concavities 61b of the sounding member 61, the sounding member 61 is mounted on the second knob member 56.

Next, the retaining member 62 is mounted on the engagement groove 56b formed in the second knob member 56 to retain the sounding member 61. Here, after the ring member 57 is disposed on the first knob member 55, the second engagement groove 55d of the first knob member 55 is brought into contact with the first engagement member 58a disposed on the knob mounting portion 52.

Then, the washer 55f is disposed on the rear end surface of the first knob member 55. The second engagement member 58b is mounted in the third engagement groove 52d of the knob mounting portion 52, which is to the rear of the washer 55f, such that the first knob member 55 is positioned on the knob mounting portion 52. In this state, the second female threaded portion 56d of the second knob member 56 is screwed onto the second male threaded portion 55e of the first knob member 55 to non-rotatively connect the first knob member 55 to the second knob member 56. When this occurs, the engagement portions 61c of the sounding member 61 are engaged with the engagement recesses 52b of the knob mounting portion 52 to non-rotatively couple the sounding member 61 to the knob mounting portion 52. In this way, the rear drag sound generating mechanism 60 can be disposed between the knob mounting portion 52 and the second knob member 56, and the first drag knob 50 will be rotatively mounted to the knob mounting portion 52.

When the first drag knob 50 is rotated, the first drag knob 50 will rotate relative to the knob mounting portion 52. In other words, the second knob member 56 that is non-rotatively coupled to the first knob member 55 will rotate relative to the sounding member 61 that is non-rotatively mounted to the knob mounting portion 52. When this occurs, the sounding pin 64 disposed in the mounting recess 63 of the second knob member 56 will be urged by the coil spring 65 and repeatedly strike the plurality of sounding concavities 61b formed in the sounding member 61 to generate clicking sounds.

With a conventional rear drag sound generating mechanism 60, good crisp clicking sounds will be difficult to obtain when the first drag knob is rotated because a sounding leaf is employed to produce sound. Accordingly, if one were to attempt to mount the sounding pin 64 and the coil spring 65 on the second knob member 56 in order to obtain good crisp clicking sounds, the sounding pin 64 and the coil spring 65 may fall out from the second knob member 56 when the second knob member 56 is to be mounted to the knob mounting portion 52, depending on the posture of the second knob member 56.

In the first embodiment, good crisp clicking sounds can be obtained when the first drag knob 50 is rotated because the sounding pin 64 mounted in the mounting recess 63 of the second knob member 56 contacts the sounding concavities 61b of the sounding member 61 by the coil spring 65. In addition, regardless of the posture that the second knob member 56 has when the second knob member 56 is being mounted to the knob mounting portion 52, the sounding member 61 and the coil spring 65 are not likely to fall out from the second knob member 56 because the sounding member 61 is mounted to the second knob member 56 with the sounding pin 64 engaged with one of the sounding concavities 61b of the sounding member 61, and the sounding member 61 is retained with the retaining member 62. Furthermore, even when one attempts to take the second knob member 56 off of the knob mounting portion 52, the sounding pin 64 is not likely to fall off of the second knob member 56 because the sounding member 61 retained by the retaining member 62 prevents the sounding pin 64 from falling off the second knob member 56.

Note that with the first drag knob 50, since the second knob member 56 is coupled to the first knob member 55, once the rear drag sound generating mechanism 60 is disposed on the second knob member 56, it will become easier to mount the second knob member 56 and the rear drug sound generating mechanism 60 to the first knob member 55 and to remove the second knob member 56 and the rear drug sound generating mechanism 60 from the first knob member 55. In addition, the design of the first drag knob 50 can be improved by installing the ring member 57 between the first knob member 55 and the second knob member 56.

Second Embodiment

Structure of the Spinning Reel

Figure 6:
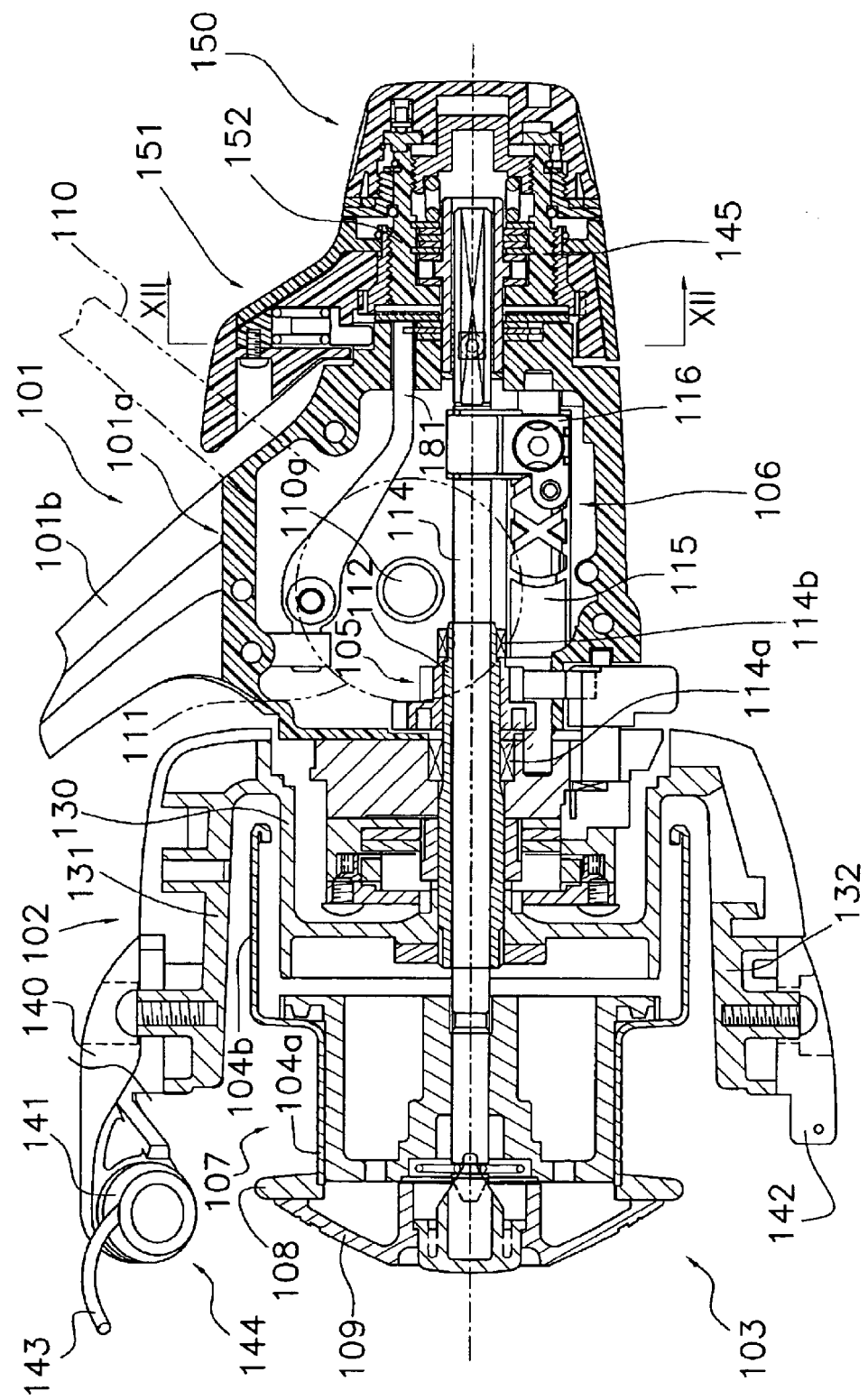
FIG. 6 is a cross sectional view of a spinning reel according to a second embodiment of the present invention.

FIG. 6 shows a spinning reel according to a second embodiment of the present invention.

As shown in FIG. 6, the spinning reel primarily includes a reel unit 101 that rotatively supports a handle 110, a rotor 102, a spool 103, a first drag knob 150, and a second drag knob 151.

Reel Unit 101

The reel unit 101 includes a reel body 101a, and a rod attachment leg 101b that extends diagonally upward and forward from the reel body 101a. An accommodation space is formed in the interior of the reel body 101a. A rotor drive mechanism 105 that rotates the rotor 102 in conjunction with the rotation of the handle 110, and an oscillating mechanism 106 that moves the spool 103 back and forth to uniformly wind fishing line, are arranged in the accommodation space. A knob mounting portion 152 is formed into a tubular shape with a slit in which members such as the pressure member 25 are disposed, and is integrally formed with the rear portion of the reel body 101a as a one-piece unitary member.

Figure 7:
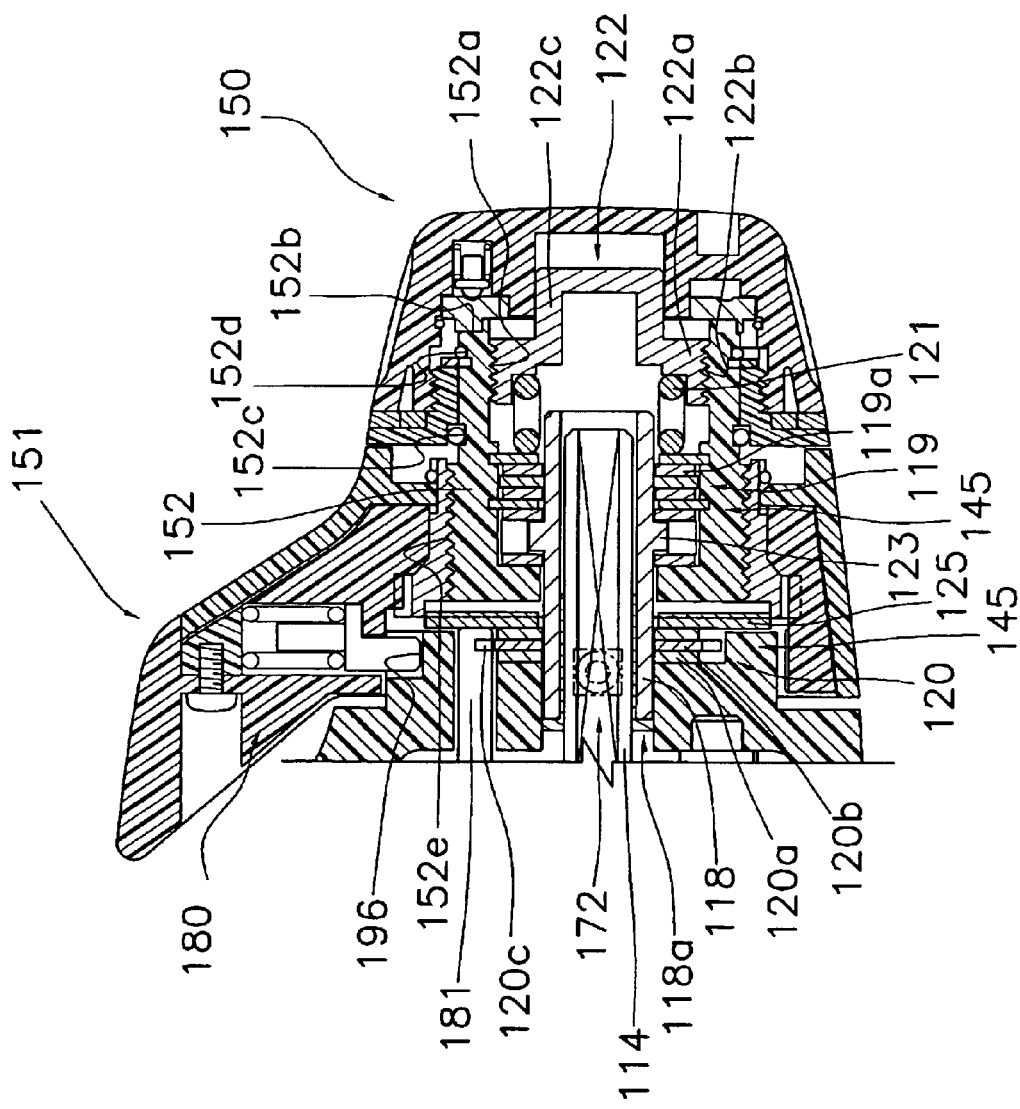
FIG. 7 is an enlarged cross sectional view of the rear portion of the spinning reel according to the second embodiment of the present invention.
Figure 8:
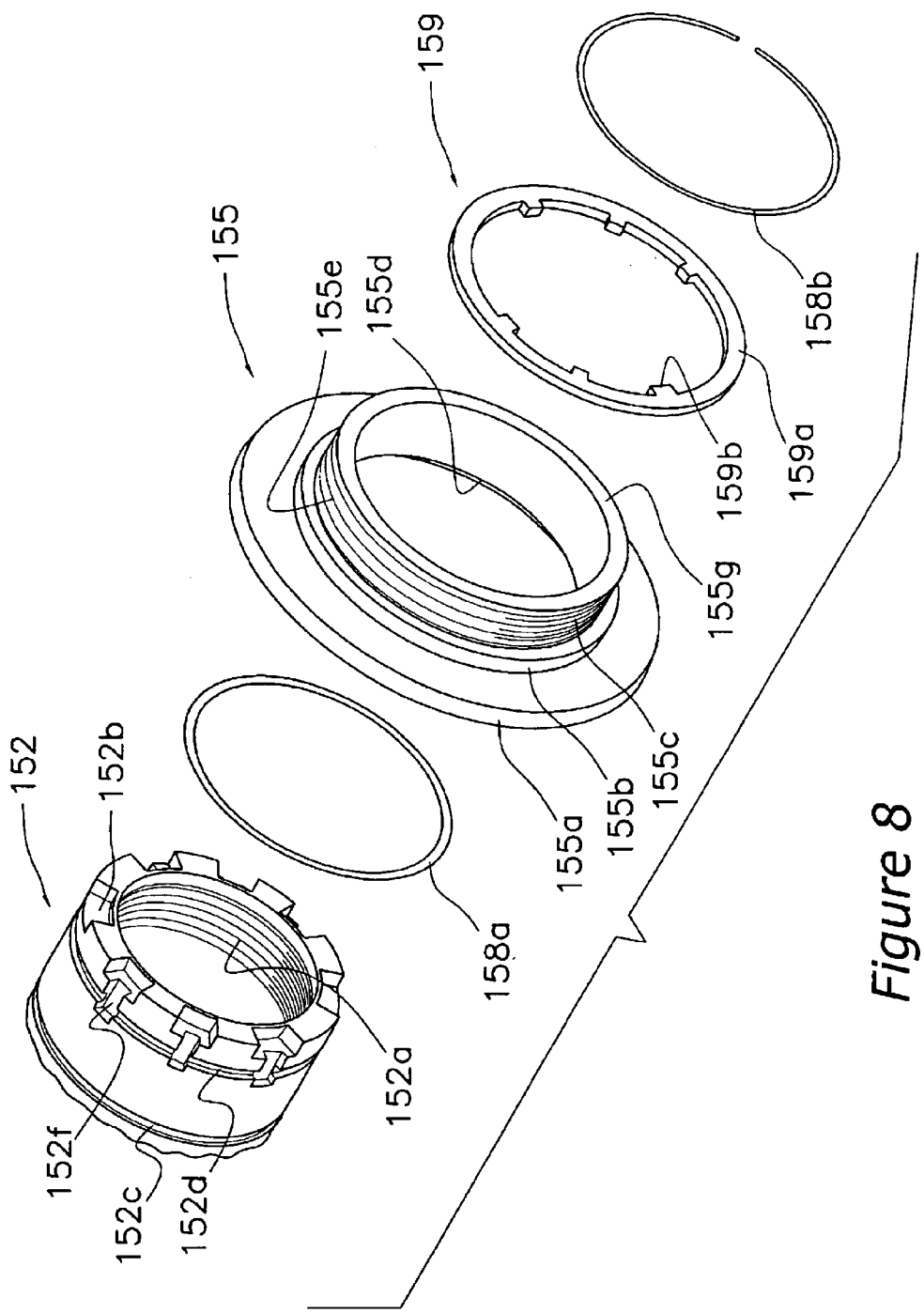
FIG. 8 is an exploded perspective view of a retaining structure of the spinning reel according to the second embodiment of the present invention.
Figure 12:
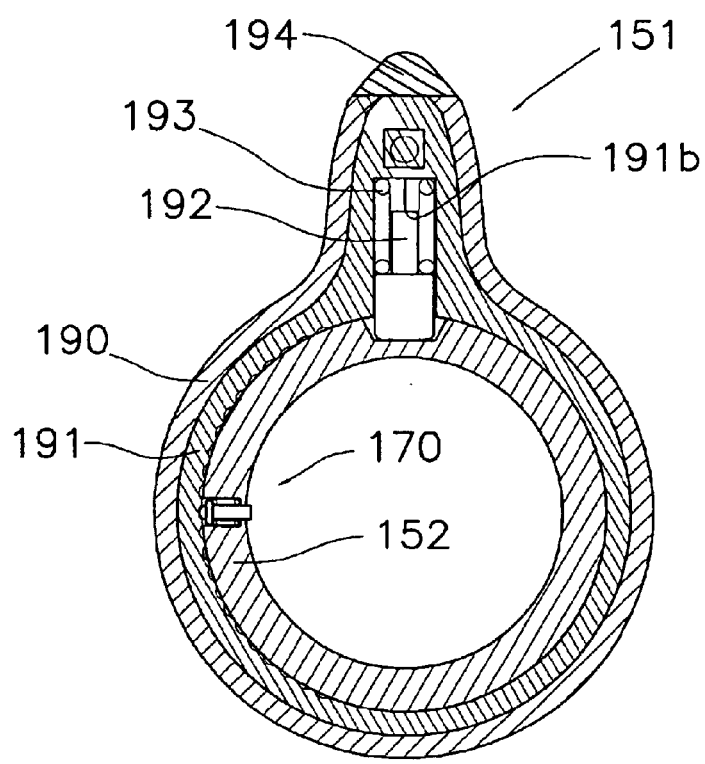
FIG. 12 is a cross sectional view of a second rear drag sound generating mechanism installed in the spinning reel (taken along line XII—XII of FIG. 6) according to the second embodiment of the present invention.
Figure 13:
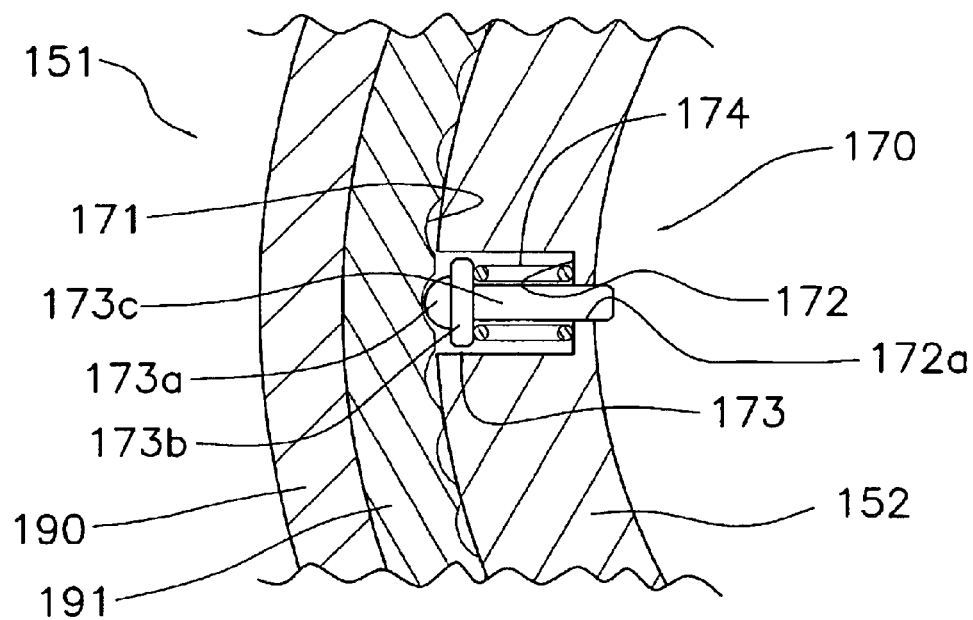
FIG. 13 is an enlarged partial cross sectional view of the second rear drag sound generating mechanism according to the second embodiment of the present invention.

As shown in FIGS. 7 and 8, a plurality of first engagement recesses 152b are formed circumferentially apart by a predetermined distance in the rear end surface of the knob mounting portion 152. In addition, a first female threaded portion 152a is formed on the rear portion of the inner peripheral surface of the knob mounting portion 152, and a third male threaded portion 152e is formed on the central portion of the outer peripheral surface of the knob mounting portion 152. An annular first annular groove 152c and an annular second annular groove 152d are formed in a predetermined spaced relationship in the rear portion of the third male threaded portion 152e. Then, as shown in FIG. 8, second engagement recesses 152f are formed in the axial direction from the rear end of the knob mounting portion 152 past the second annular groove 152d. The second engagement recesses 152f are formed in a predetermined spaced relationship in the circumferential direction, and the depths thereof are deeper than the depth of the second annular groove 152d. A positioning recess 196 is arranged on the upper portion of the knob mounting member 152 and front of the third male threaded portion 152e in order to position the second drag knob 151 in the rotational direction. Both side surfaces of the positioning recess 196 in the rotational direction are formed in fan-shape, tapering from the bottom portion of the positioning recess 196 to the opening thereof. In addition, as seen in FIGS. 12 and 13, a second mounting recess 172 of a second rear drag sound mechanism 170 (to be described later) is arranged in a side portion of the knob mounting portion 152 and forward of the third male threaded portion 152e in order to mount a second sounding pin 173 and a second coil spring 174 described below.

Rotor 102

The rotor 102 is rotatively supported on the front of the reel unit 101. As shown in FIG. 6, the rotor 102 includes a rotor cylindrical portion 130, and a first rotor arm 131 and a second rotor arm 132. The first and second rotor arms 131, 132 are arranged on mutually opposing positions of the rotor cylindrical portion 130. The rotor cylindrical portion 130 and the first and second rotor arms 131, 132 are, for example, made of an aluminum alloy, and are integrally formed with the rotor cylindrical portion 130 as a one-piece unitary unit. The first and second rotor arms 131, 132 are coupled to the rotor cylindrical portion 130 at the upper circumferential surface of the rotor cylindrical portion 130 and spread outward in the circumferential direction. The first and second rotor arms 131, 132 project outward from the rotor cylindrical portion 130, curve and then extend forward.

A first bail support member 140 is pivotably mounted to the tip of the first rotor arm 131. A line roller 141 for guiding fishing line to the spool 103 is mounted to the front end of the first bail support member 140. A second bail support member 142 is pivotably mounted to the front end of the second rotor arm 132. A bail 143 that is a wire member curved into an approximate U-shape is fixedly held between the line roller 141 and the second bail support member 142. The first bail support member 140, the second bail support member 142, the line roller 141, and the bail 143 form a bail arm 144 that guides the fishing line onto the spool 103. The bail arm 144 can pivot between a line-guiding posture shown in FIG. 6 and a line-releasing posture which is a flipped posture from the line-guiding posture.

The rotor 102 is a conventional component that is well known in the art. Accordingly, its structure and function will not be discussed or illustrated in detail herein.

Rotor Drive Mechanism 105

As shown in FIG. 6, the rotor drive mechanism 105 includes a face gear 111 and a pinion gear 112. The face gear 111 rotates together with a handle shaft 110a that is coupled to the handle 110, and the pinion gear 112 meshes with the face gear 111. The pinion gear 112 is formed in a tubular shape, and a central portion and a rear end portion thereof in the axial direction are rotatively supported on the reel unit 101 via bearings 114a and 114b. A front portion of the pinion gear 112 passes through the center portion of the rotor 102 and extends toward the spool 103. A spool shaft 114 passes through the inner peripheral portion of the pinion gear 112, and slidably moves forward and backward along the rotational axis of the pinion gear 112.

The rotor drive mechanism 105 is a conventional component that is well known in the art. Accordingly, its structure and function will not be discussed or illustrated in detail herein.

Spool 103

The spool 103 winds fishing line around the outer peripheral surface thereof, and as shown in FIG. 6, is mounted on the front portion of the rotor 102 so that the spool 103 can be shifted back and forth. The spool 103 is composed of a spool unit 107, a brim 108, and a brim fixing member 109. The spool unit 107 includes a bobbin 104a and a skirt portion 104b. The bobbin 104a is formed into a tubular shape and fishing line is wound around the outer periphery thereof. The skirt portion 104b is formed such that the diameter thereof is larger than the outer diameter of the bobbin 104a, and is formed to be integral with the rear portion of the bobbin portion 104a. The brim 108 is mounted on the front portion of the bobbin portion 104a, and is fixedly coupled to the spool unit 107 by means of the bobbin fixing member 109.

The spool 103 is a conventional component that is well known in the art. Accordingly, its structure and function will not be discussed or illustrated in detail herein.

Oscillating Mechanism 106

As shown in FIG. 6, the oscillating mechanism 106 is a device that causes the spool shaft 114 which is connected to the spool 103 to move forward and backward, and accordingly causes the spool 103 to move in the same direction. The oscillating mechanism 106 includes a worm 115 disposed below and parallel to the spool shaft 114, a slider 116 that moves back and forth along the worm 115, a guide shaft (not shown in the figures) that is disposed parallel to the spool shaft, and an intermediate gear (not shown in the figures) that is fixedly coupled to the front end of the worm 115. The slider 116 is non-rotatively mounted to the spool shaft 114.

The oscillating mechanism 106 is a conventional component that is well known in the art. Accordingly, its structure and function will not be discussed or illustrated in detail herein.

Rear Drag Mechanism 145

The rear drag mechanism 145 is a mechanism that causes a drag force to be applied to the spool 103. As shown in FIG. 7, the rear drag mechanism 145 is composed of a cylindrical first bush 118, first and second friction engagement portions 119, 120 that include a plurality of friction plates 119a, 120a, a coil spring 121 and a first pressure member 122 for urging the friction plates 119a of the first friction engagement portion 119, and a second pressure member 125 for urging the friction plates 120a of the second friction engagement portion 120.

The first bush 118 is formed in a tubular shape in which the outer peripheral surface thereof has mutually parallel chamfered portions. A second bush 118a is non-rotatively and non-slidably fitted into the front portion of the inner periphery of the first bush 118. The second bush 118a is also formed in a tubular shape in which the outer peripheral surface thereof has chamfered portions that are parallel to each other. The second bush 118a is, for example, made of a synthetic resin that is highly slidable, and the spool shaft 114 is non-rotatively and slidably fitted into the inner periphery of the second bush 118a. Thus, by disposing the highly slidable second bush 118a between the first bush 118 and the spool shaft 114, the spool shaft 114 can slide smoothly.

A flange portion 123 is arranged on the outer peripheral surface of the rear portion of the first bush 118. The friction plates 119a of the first friction engagement portion 119 are disposed to the front and rear of the flange portion 123. The coil spring 121 is disposed on the rear portion of the first friction engagement portion 119. The first pressure member 122 is connected in series with the rear portion of the coil spring 121. A front portion 122a of the first pressure member 122 is formed into a cylindrical shape, and a first male threaded portion 122b is arranged on the outer peripheral surface thereof. In addition, a rear portion 122c of the first pressure member 122 is formed into a closed-end tubular shape having a diameter that is smaller than the front portion 122a of the first pressure member 122, and the outer peripheral surface thereof has chamfered portions that are parallel to each other.

A plate member 120b non-rotatively mounted on the outer periphery of the first bush 118 is interposed between the friction plates 120a of the second friction engagement portion 120. Projections 120c that engage with a sounding spring 181 (described below) are formed circumferentially apart by a predetermined space on the outer peripheral surface of the plate member 120b. The second pressure member 125 is disposed on the rear portion of the second friction engagement portion 120, and engages with an engagement portion 195b of the second drag knob 151 (described below).

The first male threaded portion 122b of the first pressure member 122 is rotatively mounted on the first female threaded portion 152a formed in the inner peripheral surface of the knob mounting member 152. When the first pressure member 122 rotates in this state, the first pressure member 122 rotates in the interior of the knob mounting portion 152 while moving forward and backward, and compresses and decompresses the coil spring 121. The second pressure member 125 is rotatively mounted on the outer periphery of the first bush 118. When the second pressure member 125 presses on the friction plates 120a of the second friction engagement portion 120, both surfaces of the plate member 120b are pressed by the friction plate 120a.

Figure 9:
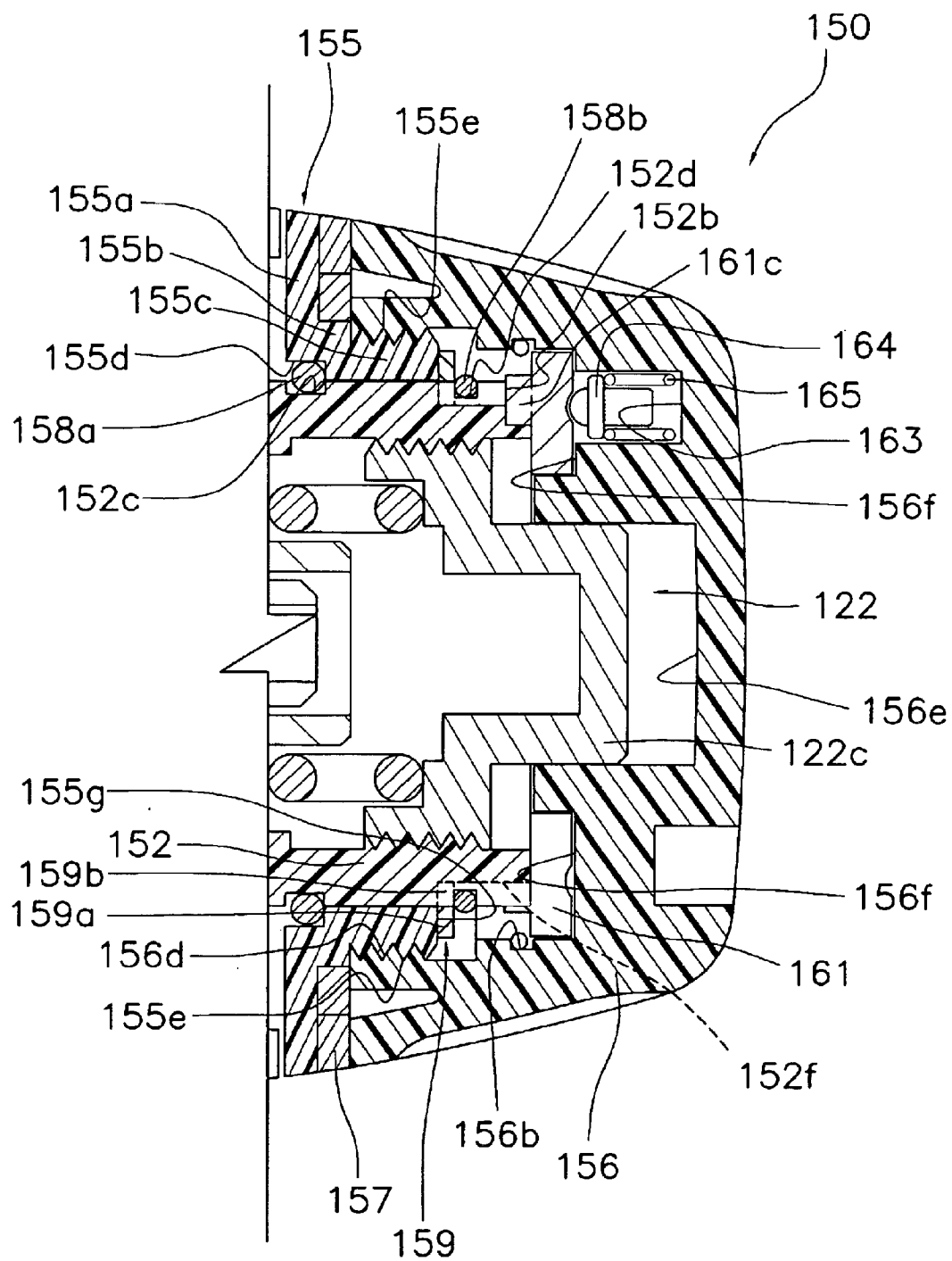
FIG. 9 is an enlarged cross-sectional view of a first drag knob of the spinning reel according to the second embodiment of the present invention.

As shown in FIGS. 8 and 9, the first drag knob 150 includes a first knob member 155, a second knob member 156, and a ring member 157. The first knob member 155 is, for example, made of a synthetic resin, and is formed into a tubular shape. The first knob member 155 includes a first tubular portion 155a, a second tubular portion 155b, and a third tubular portion 155c. The first to third tubular portions 155a, 155b, 155c are formed integrally with each other as a one-piece unitary unit.

An annular third annular groove 155d is arranged in the front portion of the inner peripheral surface of the first tubular portion 155a. A first engagement member 158a is fitted in the third engagement groove 155*d* and the first annular groove 152*c* of the knob mounting portion 152. Here, for example, an O-ring is employed as the first engagement member 158*a*. The second tubular portion 155*b* is integrally formed with the rear end of the first tubular portion 155*a*, and the outer diameter of the second tubular portion 155*b* is smaller than the outer diameter of the first tubular portion 155*a*. The third tubular portion 155*c* is integrally formed with the rear end of the second tubular portion 155*b*, and the outer diameter of the third tubular portion 155*c* is smaller than the outer diameter of the second tubular portion 155*b*. A second male threaded portion 155*e* is arranged on the outer peripheral surface of the third tubular portion 155*c*.

A retaining engagement surface (an example of retaining engagement portion) 155*g* is arranged on the rear end of the third tubular portion 155*c*. The retaining engagement surface 155*g* is formed in a planar shape that is substantially perpendicular to the rotational axis. A washer 159 is disposed on the rear end of the retaining engagement surface 155*g*. The washer 159 includes a circular portion 159*a* and projections 159*b*. The circular portion 159*a* is brought into contact with the retaining engagement surface 155*g*. The projections 159*b* are formed so that they project inward from the inner peripheral surface of the circular portion 159*a* and can engage with the plurality of second engagement recesses 152*f*. The washer 159 is positioned by the second engagement member (an example of retaining member) 158*b*. The second engagement member 158*b* is brought into contact with the rear surface of the washer 159 while being inserted into the second annular groove 152*d* formed in the knob mounting portion 152. Here, for example, a C-shaped retaining ring is employed as the second engagement member 158*b*. The outer diameter of the second engagement member 158*b* is larger than the inner diameter of the circular portion 159*a* of the washer 159.

Since the outer diameter of the second engagement member 158*b* is larger than the inner diameter of the circular portion 159*a* of the washer 159, the second engagement member 158*b* can be brought into contact not only with the projections of the washer 159, but also with the circular portion 159*a* of the washer 159. In this way, the second engagement member 158*b* can stably retain its posture while reliably retaining the retaining engagement portion rearward via the washer 159. Also, the second engagement member 158*b* is a C-shaped retaining ring, and thus the second engagement member 158*b* can be easily mounted on the second annular groove 152*d*. Note that the rotation of the retaining engagement surface 155*g* is not transmitted to the C-shaped ring by the washer 159. Thus, even though the C-shaped ring, the second engagement member 158*b* is mounted in the second annular groove 152*d*, it will be difficult for the C-shaped ring to be removed from the second annular groove 152*d*. The depth of the plurality of second engagement recesses 152*f* is greater than the depth of the second annular groove 152*d*. In this situation, when the second engagement member 158*b* is disposed in the second annular groove 152*d* with the projections 159*b* of the washer 159 being engaged with the plurality of second engagement recesses 152*f*, such that the second engagement member 158*b* and the retaining engagement surface 155*g* sandwich the washer 159 therebetween, the tips of the projections 159*b* on the washer 159 are positioned on an inner periphery of the second engagement member 158*b*. In this way, even when the retaining engagement surface 155*g* and the washer 159 move rearward, their rearward movement can be reliably retained by the second engagement member 158*b*.

The second knob member 156 is, for example, made of a synthetic resin, and is formed into a closed-end tubular shape. First and second engagement portions 156*e*, 156*f* are provided on the closed end portion of the second knob member 156. The first engagement portion 156*e* is an oval-shaped hole formed in the central bottom portion of the second knob member 156. The rear portion 122*c* of the first pressure member 122 is chamfered in parallel on the outer peripheral surface thereof and is engaged with the first engagement portion 156*e*. The rear portion 122*c* of the first pressure member 122 is non-rotative in the first engagement portion 156*e* and can slide forward and backward therein. The second engagement portion 156*f* is formed in a toroidal recessed shape in the closed end portion of the second knob member 156. A sounding member 161 (described below) is engaged with the second engagement portion 156*f*. In addition, a first mounting recess 163 is formed in the bottom portion of the second engagement portion 156*f* that is formed in a toroidal recessed shape, and a first sounding pin 164 and a first coil spring (an example of urging means) 165 (described below) are disposed in the first mounting recess 163.

An annular fourth annular groove 156*b* and a second female threaded portion 156*d* are formed on the inner peripheral surface of the second knob member 156. The fourth annular groove 156*b* is formed on the closed end side of the second knob member 156, and has a diameter that is larger than the outer diameter of the sounding mechanism 161 described below. The second female threaded portion 156*d* is formed on the open side of the second knob member 156. The second knob member 156 is threadedly coupled to the first knob member 155 by screwing the second female threaded portion 156*d* together with the second male threaded portion 155*e* of the first knob member 155. When this occurs, the ring member 157 will be disposed between the first knob member 155 and the second knob member 156. The ring member 157 is, for example, made of aluminum. Note that the design of the first drag knob 150 can be improved by installing the ring member 157 between the first knob member 155 and the second knob member 156.

Figure 10:
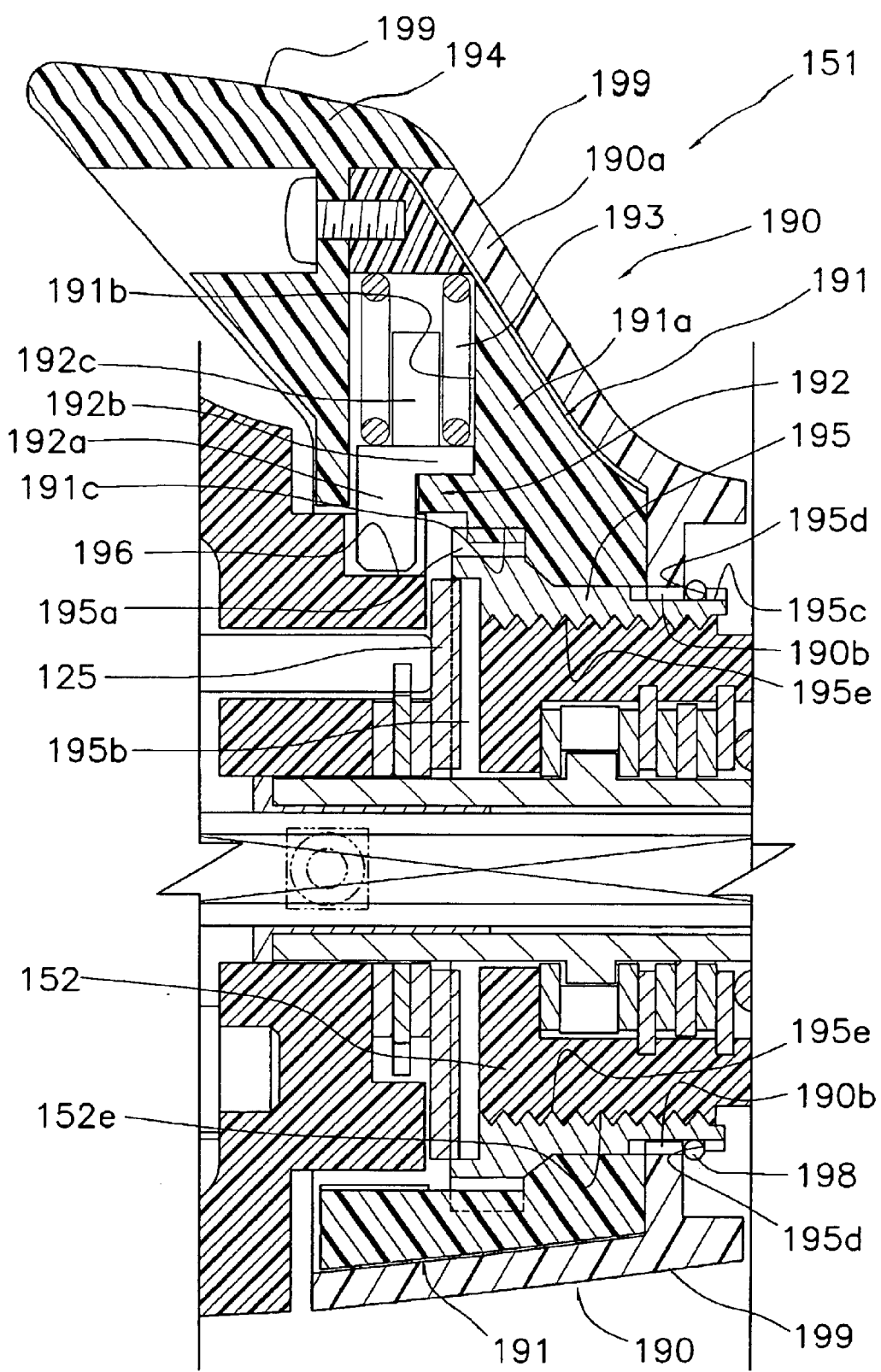
FIG. 10 is an enlarged cross-sectional view of a second drag knob of the spinning reel according to the second embodiment of the present invention.

As shown in FIG. 10, the second drag knob 151 includes a first lever member c, a second lever member 191, a positioning pin 192 and a fourth coil spring 193, a fixing member 194, and a tubular member 195. The first lever member 190 is formed in a tubular shape, and includes a first lever portion 190*a* that projects radially outward from the outer peripheral surface thereof. The first lever portion 190*a* includes an accommodation portion that opens in the forward direction. A second lever portion 191*a* (described below) can be accommodated in this accommodation portion. In addition, first engagement projections 190*b* are formed circumferentially apart by a predetermined space on the first lever member 190, projecting toward the inner peripheral portion thereof. The second lever member 191 is formed in a tubular shape, and includes a second lever portion 191*a* that projects radially outward from the outer peripheral surface. Second engagement recesses 191*c* are formed circumferentially apart by a predetermined space on the inner peripheral surface of the second lever member 191.

In addition, a fourth mounting recess 191*b* is formed in the second lever portion 191*a*, and the fourth mounting recess 191*b* is disposed such that the opening therein is pointing in the forward direction. A positioning pin 192 and a fourth coil spring 193 are mounted in the fourth mounting recess 191*b*.

The positioning pin 192 includes a fourth head portion 192*a*, a fourth mounting portion 192*b*, and a fourth shaft portion 192c. The fourth head portion 192a and the fourth mounting portion 192b are integrally formed as a one-piece unitary member in a shape that resembles an upside down L. The fourth head portion 192a corresponds to a downward pointing portion, and the fourth mounting portion 192b corresponds to a sideways pointing portion. The fourth head portion 192a is formed into a rectangular column shape, and both side surfaces of the tip portion of the fourth head portion 192a are tapered. The rear end of the fourth mounting portion 192b is in contact with the lower side surface of the fourth mounting recess 191b. The fourth shaft portion 192c is a shaft shaped portion that is connected to the fourth mounting portion 192b, and the fourth coil spring 193 is disposed around the outer periphery of the fourth shaft portion 192c. The outer end of the fourth coil spring 193 is brought into contact with the upper side surface of the fourth mounting recess 191b, and the inner end of the fourth coil spring 193 is brought into contact with the step portion between the fourth mounting portion 192b and the fourth shaft portion 192c. The fourth coil spring 193 is stored in the fourth mounting recess 191b in the compressed state, and urges the positioning pin 192 toward the positioning recess 196. Thus, if the positioning pin 192 and the fourth coil spring 193 are disposed in the fourth mounting recess 191b, the positioning pin 192 will arrive at a position opposite the positioning recess 196 formed in the upper portion of the knob mounting member as the second drag knob 151 is pivoted, and the head portion 192a of the positioning pin 192 will engage with the positioning recess 196.

The fixing member 194 serves to prevent the positioning pin 192 and the fourth coil spring 193 from falling out from the fourth mounting recess 191b, and is, for example, fixedly coupled to the lever member 191 by a bolt. This allows the second drag knob 151 to be assembled sequentially in the forward direction.

The outer diameter of the front portion of the tubular member 195 is formed to be larger than the outer diameter of the central portion thereof, and a step portion between the front portion and the central portion is formed into a tapered shape. Second engagement projections 195a are formed circumferentially apart by a predetermined space on the outer peripheral surface of the front portion of the tubular member 195. An engagement portion 195b that serves to transmit the movement of the second drag knob 151 to the second pressure member 125 is formed on the inner peripheral rim of the tubular member 195. In addition, first engagement recesses 195c that are groove shaped and extend to the rear end of the tubular member 195 are formed circumferentially apart by a predetermined space on the outer peripheral surface of the rear portion of the tubular member 195. A groove portion 195d that is at a right angle with respect to the first engagement recesses 195c is formed in the side walls of the first engagement recesses 195c. The tapered step portion and the central portion of the tubular member 195 are brought into contact with the inner peripheral surface of the second lever member 191, and the second engagement projections 195a are engaged with the second engagement recesses 191c of the second lever member 191. Then, the first engagement projections 190b of the first lever member 190 are engaged with the first engagement recesses 195c of the tubular member 195. In addition, a third engagement member 198 is brought into contact with the rear surface of the first engagement projections 190b of the first lever member 190. The third engagement member 198 is, for example, a C-shaped retaining ring, and is engaged with the groove portion 195d. Here, a third female threaded portion 195e is arranged on the inner peripheral surface of the tubular member 195, and by screwing the third female threaded portion 195e onto the third male threaded portion 152e of the knob mounting portion 152, the tubular member 195 will be rotatively mounted to the knob mounting portion 152.

In the second drag knob 151, the material employed for the first lever member 190 and the fixing member 194 is different from the material employed for the second lever member 191. For example, the first lever member 190 and the fixing member 194 are made from ABS resin, and the second lever member 191 is made from a synthetic resin. A metal plate layer 199 is plated onto the surface layer side of the first lever member 190 and the fixing member 194. By forming the first lever member 190 and the fixing member 194 from a material that is different from the second lever member 191, shrink marks caused by deviations in thickness can be prevented when the plate layer 199 is plated in the plating process.

Rear Drag Sounding Mechanism

A rear drag sounding mechanism includes a first rear drag sound generating mechanism 160 (a sound generating mechanism used when the first drag knob 150 is operated), a second rear drag sound generating mechanism 170 (a sound generating mechanism used when the second drag knob 151 is operated), and a third rear drag sound producing mechanism 180 (a sound producing mechanism used when the rear drag mechanism 145 is operated).

First Rear Drag Sound Generation Mechanism 160

Figure 11:
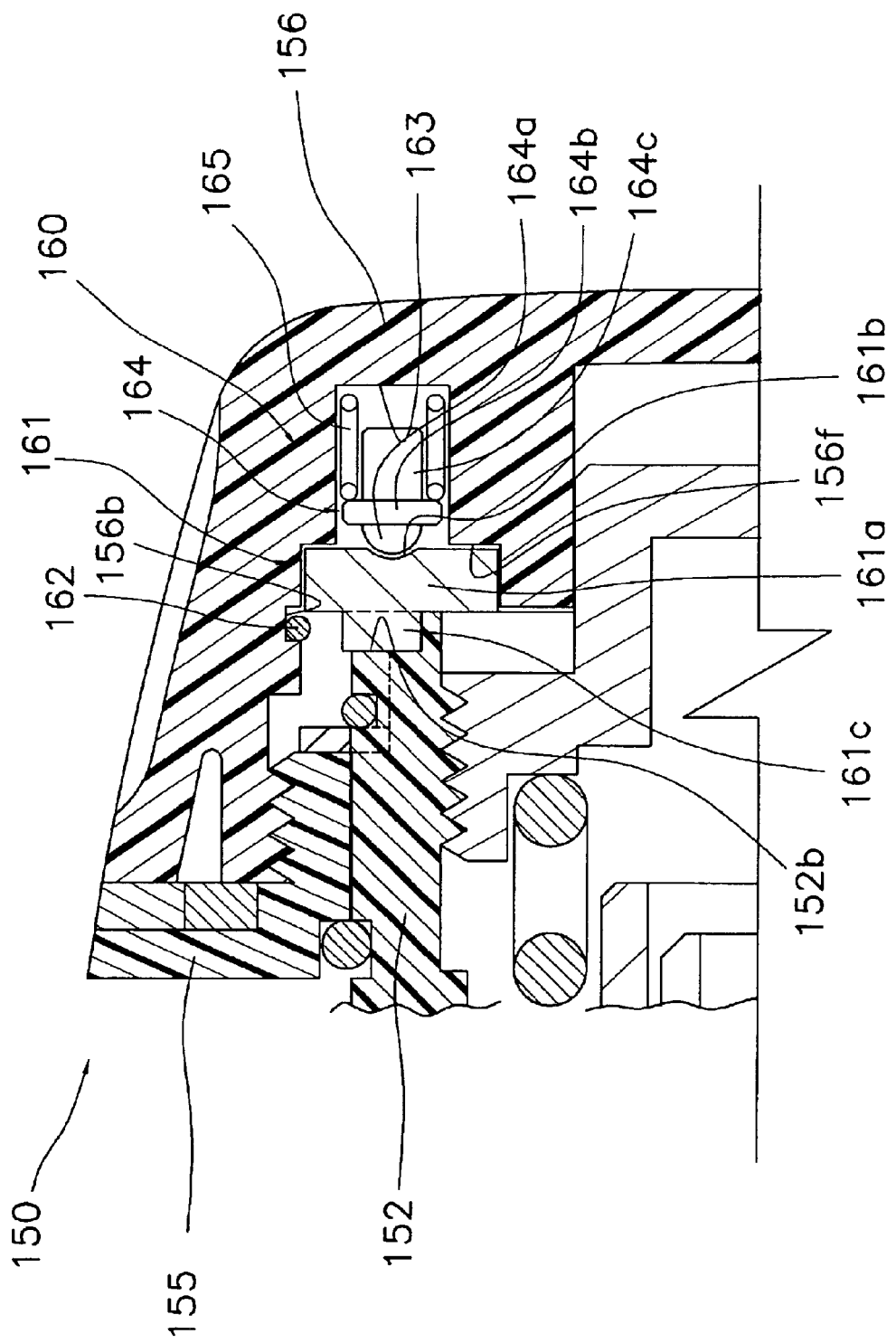
FIG. 11 is an enlarged cross sectional view of a first rear drag sound generating mechanism installed on the spinning reel according to the second embodiment of the present invention.

As shown in FIG. 11, the first rear drag sound generating mechanism 160 is disposed between the knob mounting portion 152 and the second knob member 156, and generates sound through relative rotation of the knob mounting portion 152 and the first drag knob 150. The first rear drag sound generating mechanism 160 includes a sounding member 161, a retaining member 162, a first mounting recess 163, a first sounding pin 164, and a first coil spring 165.

The sounding member 161 includes a disk portion 161a that is formed into a ring shape, a plurality of sounding concavities 161b that are formed circumferentially apart in one surface of the disk portion 161a, and engagement portions 161c that are integrally formed with the other surface of the disk portion 161a. The disk portion 161a of the sounding member 161 is engaged with the second engagement portion 156f of the second knob member 156, and can rotate with respect to the second knob member 156. In addition, the outer diameter of the disk portion 161a is formed to be smaller than the inner diameter of the fourth annular groove 156b. The engagement portion 161c is formed to project toward the first engagement recesses 152b formed in the rear end surface of the knob mounting portion 152, and engages with the first engagement recesses 152b. The retaining member 162 is arranged in order to prevent the sounding member 161 from falling out. The retaining member 162 is, for example, a C-shaped retaining ring, and is disposed in the fourth annular groove 156b. The inner diameter of the retaining member 162 is formed to be smaller than the outer diameter of the disk portion 161a of the sounding member 161, such that the retaining member 162 and the second engagement portion 156f sandwich the disk portion 161a. The first mounting recess 163 is formed in the closed end of the second knob member 156, in a position opposite one of the plurality of sounding concavities 161b.

The first sounding pin 164 is mounted in the first mounting recess 163 so that it can move forward and backward, and engages with the first sounding concavities 161b of the sounding member 161. The first sounding pin 164 includes a first head portion 164a, a first mounting portion 164b that is connected to the first head portion 164a, and a first shaft portion 164c that is connected to the first mounting portion 164b. The first head portion 164a is formed such that the front end thereof is a smooth convex shape. The front end of the front head portion 164a generates a clicking sound by repeatedly striking the first sounding concavities 161b. Here, since the front end of the first head portion 164a of the first sounding pin 164 is formed in a smooth convex shape, the first sounding pin 164 generates clicking sounds with little resistance. The first mounting portion 164b is formed to have a diameter that is larger than that of the first head portion 164a and smaller than the inner diameter of the first mounting recesses 163. The first shaft portion 164c is a shaft shaped component that is formed to have a diameter that is smaller than that of the first mounting portion 164b, and the first coil spring 165 can be disposed around the outer periphery of the first shaft portion 164c. Thus, by forming the first shaft portion 164c to have a diameter that is smaller than that of the first mounting portion 164b, the front end of the first coil spring 165 can be brought into contact with a step portion between the first mounting portion 164b and the first shaft portion 164c.

The first coil spring 165 is disposed on the outer periphery of the first shaft portion 164c of the first sounding pin 164. When this occurs, the base end of the first coil spring 165 is brought into contact with the bottom portion of the first mounting recess 163, and the front end of the first coil spring 165 is brought into contact with the step portion between the first mounting portion 164b and the first shaft portion 164c. The first coil spring 165 is accommodated in the first mounting recess 163 in the compressed state, and urges the first sounding pin 164 toward the first sounding concavities 161b.

Second Rear Drag Sound Generating Mechanism 170

As shown in FIG. 12, the second rear drag sound generating mechanism 170 is disposed between the knob mounting portion 152 and the second drag knob 151, and generates sound when the second drag knob 151 is pivoted. As shown in FIG. 13, the second rear drag sound generating mechanism 170 includes second sounding concavities 171, a second mounting recess 172, a second sounding pin 173, and a second coil spring 174 (an example of urging means). The second sounding concavities 171 are formed circumferentially apart in a pivot range of an inner peripheral surface of the second lever member 191. The second sounding concavities 171 are formed into groove shapes that extend in the axial direction. When the second drag knob 151 is pivoted, the second sounding pin 173 can engage in the second sounding concavities 171 even if the second drag knob 151 moves in the axial direction with respect to the knob mounting portion 152. By arranging these second sounding concavities 171 circumferentially apart, the second sounding pin 173 can stably engage in the second sounding concavities 171 in response the movement of the second drag knob 151 in the axial direction and the circumferential direction. This allows good crisp clicking sounds and a modulated clicking feeling to be stably obtained. The second mounting recess 172 is formed in the outer peripheral side surface of the knob mounting portion 152 so as to oppose the second sounding concavities 171. An engagement hole 172a is formed in the bottom portion of the second mounting recess 172.

The second sounding pin 173 is mounted in the second mounting recess 172 such that it can move in and out therefrom, and engages with the second sounding concavities 171. The second sounding pin 173 includes a second head portion 173a, a second mounting portion 173b that is connected to the second head portion 173a, and a second shaft portion 173c that is connected to the second mounting portion 173b. The second head portion 173a is formed such that the front end thereof is a smooth convex shape. The front end of the second head portion 173a generates a clicking sound by repeatedly striking the second sounding concavities 171. Here, the front end of the second head portion 173a of the second sounding pin 173 is formed in a smooth convex shape, and thus the second sounding pin 173 generates clicking sounds with little resistance. The second mounting portion 173b is formed to have a diameter that is larger than that of the second head portion 173a and smaller than the inner diameter of the second mounting recesses 172. The second shaft portion 173c is a shaft shaped component that is formed to have a diameter that is smaller than that of the second mounting portion 173b, and the second coil spring 174 can be disposed around the outer periphery thereof. Thus, by forming the second shaft portion 173c to have a diameter that is smaller than that of the second mounting portion 173b, the front end of the second coil spring 174 can be brought into contact with the step portion between the second mounting portion 173b and the second shaft portion 173c. In addition, the second shaft portion 173c is slidably engaged in the axial direction in the engagement hole 172a formed in the second mounting recess 172. By engaging the second shaft portion 173c of the second sounding pin 173 in the engagement hole 172a of the second mounting recesses 172, the second sounding pin 173 will be stable in the axial direction inside the second mounting recesses 172 and can slide therein. This allows the second head portion 173a of the second sounding pin 173 to engage the second sounding concavities 171 reliably, and allows good crisp clicking sounds and a modulated clicking feeling to be stably obtained.

The second coil spring 174 is disposed on the outer periphery of the second shaft portion 173c of the second sounding pin 173. When this occurs, the base end of the second coil spring 174 is brought into contact with the bottom portion of the second mounting recess 172, and the front end of the second coil spring 174 is brought into contact with the step portion between the second mounting portion 173b and the second shaft portion 173c. The second coil spring 174 is accommodated in the second mounting recess 172 in the compressed state, and urges the second sounding pin 173 toward the second sounding concavities 171. When this type of the second coil spring 174 is employed, jerkiness of the second sounding pin 173 inside the second mounting recess 172 can be reduced due to the second coil spring 174. This allows the second sounding pin 173 to be smoothly engaged in the second sounding concavities 171 by the urging force of the second coil spring 174, and allows good crisp clicking sounds and a modulated clicking feeling to be obtained. Also, the outer peripheral surface of the second mounting portion 173b moves in the axial direction along the inner peripheral surface of the second mounting recess 172. Because the second head portion 173a of the second mounting portion 173b has a diameter that is smaller than that of the second mounting portion 173b, the gaps between the second sounding concavities 171, which are formed opposite the second head portion 173a, can be reduced. In this way, good crisp clicking sounds can be produced with short sound generating gaps. Then, the clicking feeling generated when the second drag knob 151 is pivoted can also be made to have a fine modulation. Note that by making the outer peripheral surface of the second mounting portion 173b to move in the axial direction of the second shaft portion 173c within the inner peripheral surface of the second mounting recess 172, the movement of the second sounding pin 173 will be stable, and thus even if the gaps between the second sounding concavities 171 are reduced, the clicking sounds and the clicking feeling will be clearly noticed.

In these ways, the second sounding pin 173 can repeatedly strike the second sounding concavities 171 and generate sounds when the second drag knob 151 is pivoted. At this point, the second coil spring 174 continuously urges the second sounding pin 173 toward the second sounding concavities 171 such that the second coil spring 174 can reliably engage with the second sounding concavities 171. In this way, even if the gap between the second sounding concavities 171 is changed, the second sounding pin 173 can be reliably brought into contact with the second sounding concavities 171 and produce sounds, and good crisp clicking sounds and a modulated clicking feeling can be obtained. Note that by forming the second sounding concavities 171 in the second drag knob 151, which is disposed on the outer periphery of the knob mounting portion 152, when the second sounding pin 173 strikes the second sounding concavities 171 of the second drag knob 151, clicking sounds will be generated on the knob mounting portion side, and it will be difficult for the clicking sounds to be confined within the reel interior. This allows good crisp clicking sounds to be obtained.

Third Rear Drag Sound Generating Mechanism 180

The third rear drag sound generating mechanism 180 generates sound when the rear drag mechanism 145 is operated. As shown in FIGS. 6 and 7, the third rear drag sound generating mechanism 180 includes a sounding spring 181, and projections 120c that are formed on the outer peripheral surface of the plate member 120b. The sounding spring 181 is, for example, a plate spring that is formed into an approximate L shape, and is fixedly coupled at one end thereof to the reel body 101a. The other end of the sounding spring 181 engages with the projection 120c. In this way, when the rear drag mechanism 145 is operated, the spool shaft 114 and the first bush 118 rotate together with the plate member 120b, and the projections 120c of the plate member 120b repeatedly strike the other end of the sounding spring 181 and generate sound.

Operation of the Spinning Reel

When the spinning reel described above is to be used, the bail 143 will be pushed over to the line releasing side when the fishing line is to be reeled out. Then, when the fishing rod is cast, fishing line is reeled out from the spool 103. When the fishing line is to be retrieved, the bail 143 is returned to the line retrieving side. When the handle 110 is rotated in the line winding direction in this state, the rotational force is transmitted to the pinion gear 112 via the handle shaft 110a and the face gear 111. The rotational force transmitted to the pinion gear 112 rotates the rotor 102 coupled to the front portion of the pinion gear 112. In addition, the rotational force transmitted to the pinion gear 112 simultaneously rotates the worm 115 via the intermediate gear (not shown in the figures) that meshes with the pinion gear 112. When this occurs, the slider 116 that meshes with the spiral grooves of the worm 115 is guided by the guide shaft (not shown in the figures) and moves forward and backward. When the slider 116 moves, the spool shaft 114 and the spool 103 also reciprocatingly move forward and backward together with the slider 116. Fishing line that is guided from the bail 143 and the line roller 141 is uniformly wound around the outer periphery of the spool 103 forward and backward due to the rotation of the rotor 102 and the forward and backward movement of the spool 103.

When a spinning reel that operates in the above-described manner is used, if a fish is hooked and pulls on the fishing line with a force that exceeds a predetermined drag force, the rear drag mechanism 145 will be activated and the spool shaft 114 and the spool 103 will rotate relative to each other. When this occurs, the projections 120c of the plate member 120b in the third rear drag sound generating mechanism 180 will repeatedly strike the end of the sounding spring 181 and generates sound.

Thus, by operating the first drag knob 150 and the second drag knob 151, the drag force of the rear drag mechanism 145 will be set to a predetermined level. When the first drag knob 150 is tightened, the first pressure member 122 inserted into the first engagement portion 156e of the second knob member 156 will rotate while moving forward, and the coil spring 121 coupled to the first pressure member 122 will be pushed inward. Then, the pressing force applied to the plurality of friction plates 119a of the first friction engagement portion 119 will greatly increase. When this occurs, both surfaces of the flange portion 123 of the first bush 118 are interposed between the friction plates 119a, and the pressure applied to both surfaces of the flange portion 123 greatly increases. Thus, it will become difficult to rotate the spool shaft 114 that is non-rotative with respect to the first bush 118, and the drag force applied to the spool 103 will strengthen. On the other hand, when the first drag knob 150 is loosened, the first pressure member 122 will rotate while moving rearward, and the compressed state of the coil spring 121 will be gradually released. When this occurs, the pressure on the flange portion 123 interposed between the friction plates 119a will be released. Accordingly, it will become easier to rotate the spool shaft 114, which is non-rotative with respect to the bush 118, and the drag force applied to the spool 103 will weaken.

When the second drag knob 151 is pressed and the second drag knob 151 is tightened, the second pressure member 125 presses on the second friction engagement portion 120 via the engagement portion 195b. Then, the pressing force applied to the plurality of friction plates 120a of the second friction engagement portion 120 will greatly increase. When this occurs, both surfaces of the plate member 120b that is non-rotatively mounted to the outer periphery of the first bush 118 will be interposed by the friction plates 120a, and the pressure applied to both surfaces of the plate member 120b will greatly increase. Thus, it will also become difficult to rotate the spool shaft 114 that is non-rotative with respect to the first bush 118, and the drag force applied to the spool 103 will strengthen. On the other hand, when the second drag knob 151 is loosened, the second friction engagement portion 120 will be gradually released from the pressed state by the second pressure member 125. When this occurs, the spool shaft 114, which is non-rotative with respect to the bush 118, will become easier to rotate, and the drag force of the spool 103 will weaken.

Assembly and Operation of the First Rear Drag Sounding Mechanism

As shown in FIG. 10, in order to assemble the first rear drag sound generating mechanism 160, the first sounding pin 164 and the first coil spring 165 are placed in the first mounting recess 163 of the second knob member 156. Then, while the first head portion 164a of the first sounding pin 164 is in contact with one of the first sounding concavities 161b of the sounding member 161, the sounding member 161 is mounted on the second engagement portion 156f of the second knob member 156. Next, the retaining member 162 is mounted on the fourth annular groove 156b formed in the second knob member 156 to retain the sounding member 161.

Thus, after the first rear drag sound generating mechanism 160 is assembled, in order to mount the first drag knob 150 to the knob mounting portion 152, as shown in FIGS. 8 and 9, the ring member 157 is first mounted on the first knob member 155, and then the third annular groove 155d of the first knob member 155 is brought into contact with the first engagement member 158a disposed in the knob mounting portion 152. Then, the washer 159 is disposed on the rear end surface of the first knob member 155. The second engagement member 158b is mounted in the second annular groove 152d of the knob mounting portion 152 that is to the rear of the washer 159, and the position of the first knob member 155 is determined relative to the knob mounting portion 152. In this state, the second female threaded portion 156d of the second knob member 156 is screwed onto the second male threaded portion 155e of the first knob member 155 to non-rotatively couple the first knob member 155 to the second knob member 156. When this occurs, the engagement portions 161c of the sounding member 161 are engaged with the first engagement recesses 152b of the knob mounting portion 152 to non-rotatively couple the sounding member 161 to the knob mounting portion 152.

Here, by coupling the second knob member 156 to the first knob member 155 after the first rear drag sound generating mechanism 160 is disposed on the second knob member 156, it will become easier to mount the second knob member 156 to the first knob member 155, and to remove the second knob member 156 from the first knob member 155, together with the first rear drag sound generating mechanism 160.

When the first drag knob 150 is rotated, the first knob member 155 will rotate relative to the knob mounting portion 152 in a state in which the knob mounting portion 152 is not movable in the axial direction. In other words, the second knob member 156 which is non-rotatively coupled to the first knob member 155 will rotate relative to the sounding member 161 which is non-rotatively mounted to the knob mounting portion 152. When this occurs, the first sounding pin 164 which disposed in the first mounting recess 163 of the second knob member 156 will be urged by the first coil spring 165, and repeatedly strike the plurality of sounding concavities 161b formed in the sounding member 161 to generate clicking sounds. Here, the first drag knob 150 is not movable in the axial direction with respect to the knob mounting portion 152, and thus it will be difficult for a height difference between the first drag knob 150 and the second drag knob 151 to develop. Thus, the outer shape of the first drag knob 150 and the second drag knob 151 can be formed such that they smoothly connect together.

With a conventional rear drag sound generating mechanism 160, good crisp clicking sounds will be difficult to obtain when the first drag knob 150 is rotated, because a sounding leaf is employed to produce sound. Accordingly, if one were to attempt to mount the first sounding pin 164 and the first coil spring 165 on the second knob member 156 in order to obtain good crisp clicking sounds, the first sounding pin 164 and the first coil spring 165 may fall out from the second knob member 156 when the first sounding pin 164 and the first coil spring 165 are to be mounted to the knob mounting portion 152, depending on the posture of the second knob member 156.

In the second embodiment of the present invention, good crisp clicking sounds can be obtained when the first drag knob 150 is rotated because the first sounding pin 164 mounted in the first mounting recess 163 of the second knob member 156 engages with the sounding concavities 161b of the sounding member 161 by the urging force of the first coil spring 165. In addition, even if one attempts to mount the second knob member 156 to the knob mounting portion 152 in any type of posture, it will be difficult for the sounding member 161 and the first coil spring 165 to fall out from the second knob member 156 because the sounding member 161 is mounted to the second knob member 156 with the first sounding pin 164 engaged with one of the sounding concavities 161b of the sounding member 161, and the sounding member 161 is retained with the retaining member 162. Furthermore, even if one attempts to take the second knob member 156 off of the knob mounting portion 152, it will be difficult for the first sounding pin 164 to fall off of the second knob member 156 because the sounding member 161 that is retained by the retaining member 162 regulates the removal of the first sounding pin 164 from the second knob member 156.

Note that with the first drag knob 150, by connecting the second knob member 156 to the first knob member 155, after the rear drag sound generating mechanism 160 is disposed on the second knob member 156, it will become easier for the second knob member 156 to be mounted to the first knob member 155 and to be removed from the first knob member 155, together with the rear drug sound generating mechanism 160. In addition, the design of the first drag knob 150 can be improved by installing the ring member 157 between the first knob member 155 and the second knob member 156.

Assembly and Operation of the Second Rear Drag Sounding Mechanism

As shown in FIGS. 12 and 13, in order to assemble the second rear drag sound generating mechanism 170, the second sounding pin 173 and the second coil spring 174 are placed in the second mounting recess 172 formed in the knob mounting portion 152. When this occurs, the second coil spring 174 is disposed around the outer periphery of the second shaft portion 173c of the second sounding pin 173, and the second shaft portion 173c of the second sounding pin 173 engages with the engagement hole 172a formed in the bottom portion of the second mounting recess 172. Then, the second head portion 173a of the second sounding pin 173 will be in a state in which it can be brought into contact with the second sounding concavities 171 formed in the second lever member 191.

Thus, after the second rear drag sound generating mechanism 170 is assembled, the second drag knob 151 will be assembled. As shown in FIGS. 7 and 10, the second lever member 191 is first placed in the first lever member 190. Then, the positioning pin 192 and the fourth coil spring 193 are placed in the fourth mounting recess 191b of the second lever member 191. The fixing member 194 is fixedly coupled to the second lever member 191 by a bolt so that the positioning pin 192 and the fourth coil spring 193 will not fall out from the fourth mounting recess 191b. Next, the second engagement recesses 191c of the second lever member 191 and the first engagement projections 190b of the first lever member 190 are respectively engaged with the second engagement projections 195a and the first engagement recesses 195c of the tubular member 195. Then, with the third engagement member 198 in contact with the rear surface of the first engagement projections 190b of the first lever member 190, the third engagement member 198 is inserted into the groove 195d formed in the side wall portions of the first engagement recesses 195c of the tubular member 195.

In mounting the second drag knob 151 assembled as noted above to the knob mounting portion 152, the third male threaded portion 152e formed on the knob mounting portion 152 is screwed together with the third female threaded portion 195e arranged on the inner peripheral surface of the tubular member 195. At this point, the second head portion 173a of the second sounding pin 173 of the second rear drag sound generating mechanism 170 will be brought into contact with the second sounding concavities 171 formed in the second lever member 191. In this way, the second drag knob 151 is pivotably mounted on the knob mounting portion 152, and the second rear drag sound generating mechanism 170 will be disposed between the second drag knob 151 and the knob mounting portion 152.

When the second drag knob 151 mounted on the knob mounting portion 152 as described above is pivoted, the second drag knob 151 and the knob mounting portion 152 rotate relative to each other. When this occurs, the second sounding pin 173 disposed in the second mounting recess 172 of the knob mounting portion 152 will be in a state in which it is urged by the second coil spring 174, and repeatedly strike the plurality of second sounding concavities 171 formed in the second lever member 191 to generate clicking sounds.

With a conventional rear drag sound generating mechanism for a spinning reel that corresponds to the second rear drag sound generating mechanism 170, sound is generated by bending an elastic plate with a projection and allowing the elastic plate to strike an adjacent projection. Because of this, the elastic plate oscillates when it strikes the projections, and it is difficult to generate clear clicking sounds. In particular, if the pitch between the projections is set to be very small in order to make it easier to finely adjust the lever member, the amount of bending in the elastic plate will decrease, and the sound generated by the elastic plate when it strikes the projections will also decrease. When this occurs, it is difficult to generate clicking sounds when the second drag knob 151 is pivoted. In addition, when the pitch between the projections is set to be small and the bending of the elastic plate is reduced, the operational feeling produced when the second drag knob 151 is pivoted will be very small, and it will be difficult to feel the clicking with one's body. With a rear drag sound generating mechanism that employs this type of elastic plate, the more the pitch between the projections is narrowed, the more difficult it will be to obtain good crisp clicking sounds and a modulated clicking feeling.

With the second rear drag sound generating mechanism 170 of the second embodiment, the second sounding pin 173 and the second coil spring 174 are employed to produce sounds. The second sounding pin 173 is disposed in the second mounting recess 172 of the knob mounting portion 152, and engages with the second sounding concavities 171 of the second drag knob 151 by the second coil spring 174. When this occurs, the second sounding pin 173 repeatedly strikes the second sounding concavities 171 to generate sounds as the second drag knob 151 is pivoted. In other words, in order for the second sounding pin 173 to reliably engage with the second sounding concavities 171, the second coil spring 174 continuously urges the second sounding pin 173 toward the sounding concavities 171, and thus regardless of the size of gap between the second sounding concavities 171, the second sounding pin 173 can be reliably brought into contact with the second sounding concavities 171 to generate sounds, and good clear clicking sounds and a modulated clicking feeling can be obtained.

Assembly of the Retaining Structure of the First Drag Knob

As described below, in order to prevent the first drag knob 150 from falling out rearward from the knob mounting portion 152, the retaining structure is employed herein.

First, the ring member 157 is disposed on the first knob member 155. Then, the third annular groove 155d of the first knob member 155 is engaged with the first engagement member 158a disposed in the first annular groove 152c of the knob mounting portion 152. Next, the washer 159 is disposed in the rear portion of the third tubular portion 155c of the first knob member 155. When this occurs, the projections 159b of the washer 159 engage with the second engagement recesses 152f from the rear end of the knob mounting portion 152, and the front surface of the circular portion 159a of the washer 159 is brought into contact with the retaining engagement surface 155g of the first knob member 155. Finally, the second engagement member 158b is brought into contact with the rear surface of the washer 159 while being engaged with the second annular groove 152d. Rearward movement of the first knob member 155 can be regulated via the washer 159 due to the second engagement member 158b. Thus, after the rearward movement of the first knob member 155 is regulated, the second knob member 156 is connected to the first knob member 155. In this way, the first drag knob 150 is retained with respect to the knob mounting portion 152.

With a conventional retaining structure of a rear drag knob for a spinning reel, the first drag knob 150 is retained by bringing the retaining engagement surface 155g into contact with the front surface of the second engagement member 158b. However, when the first drag knob 150 is rotated, there are times when the second engagement member 158b in contact with the retaining engagement surface 155g of the first drag knob 150 will simultaneously rotate therewith. When this occurs, the second engagement member 158b must retain the first drag knob 150 in the rotated state, and thus it may be difficult to produce torsion in the second engagement member 158b and difficult to stably maintain the posture of the second engagement member 158b.

With the retaining structure of the rear drag knob for a spinning reel according to the second embodiment, the circular portion 159a of the washer 159 is brought into contact with the retaining engagement surface 155g, and the projections 159b of the washer 159 are engaged with the plurality of second engagement recesses 152f formed in the knob mounting portion 152. Thus, when the washer 159 is situated, the washer 159 in contact with the retaining engagement surface 155g will regulate rotation with respect to the knob mounting portion 152 even if the retaining engagement surface 155g rotates. Thus, because the retaining engagement surface 155g and the second engagement member 158b are disposed such that the washer 159 that is not rotative relative to the knob mounting portion 152 is interposed therebetween, the rotation of the retaining engagement surface 155g will not be transmitted to the second engagement member 158b by the washer 159 even if the retaining engagement surface 155g is rotated. This allows the posture of the second engagement member 158b to be stably maintained.

Figure 14:
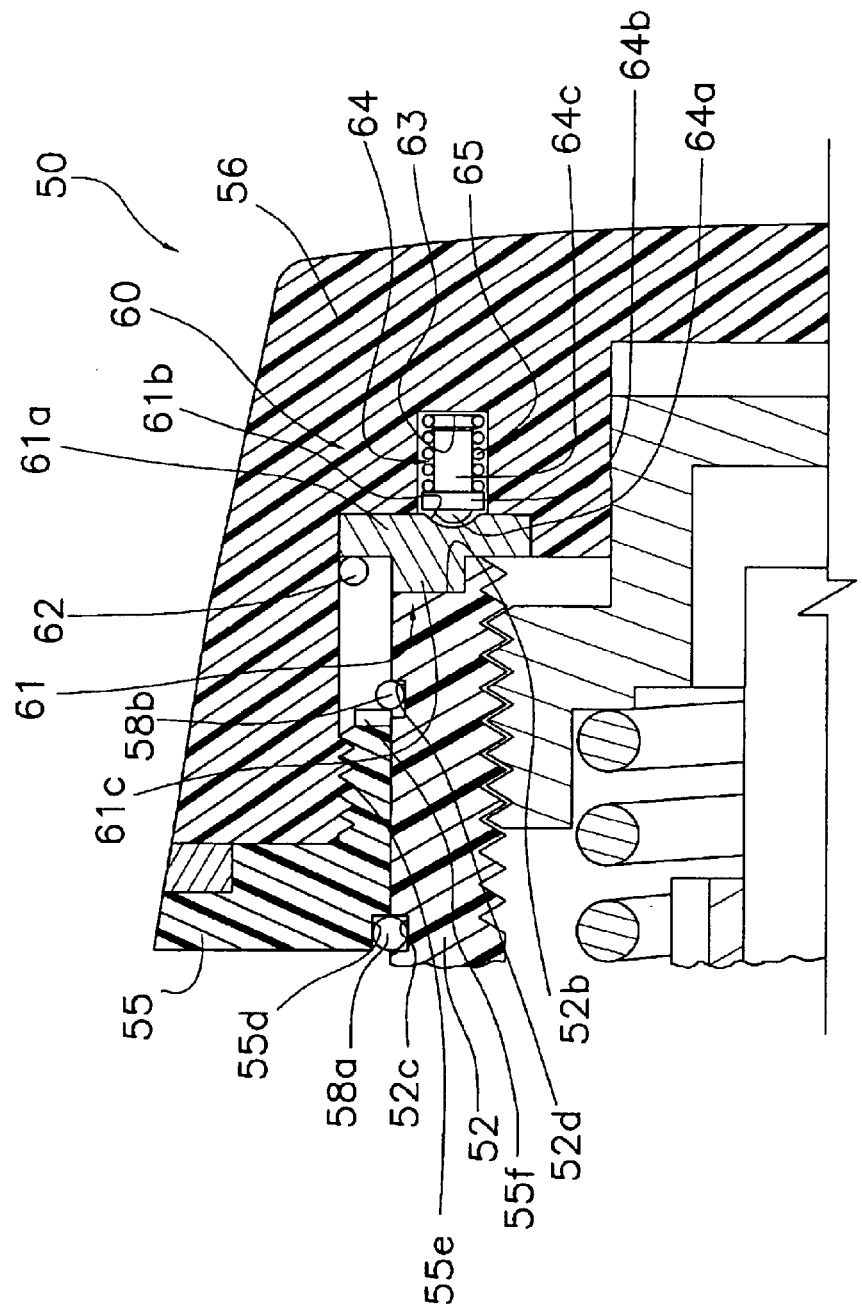
FIG. 14 is an enlarged cross sectional view of a rear drag sound generating mechanism installed on the spinning reel according to the another embodiment of the present invention.

Other Embodiments (a) In the aforementioned first embodiment, the retaining member 62 was installed in the engagement groove 56b of the second knob member 56. However, the method of installing the retaining member 62 is not limited to the aforementioned embodiment, and may be any method so long as the sounding member 61 can be retained. For example, by not forming the engagement groove 56*b* in the second knob member 56 as shown in FIG. 14, the sounding member 61 may be retained by mounting the retaining member 62 on the inner peripheral surface of the knob member such that the retaining member urges the sounding member from the inner peripheral surface of the knob member in the radially outward direction. In this case, the retaining member 62 is, for example, a C-shaped ring.

(b) In the aforementioned embodiment, the second engagement groove 55*d* was formed in the inner peripheral surface of the first tubular portion 55*a* of the first knob member 55. However, the position in which the second engagement groove 55*d* is formed is not limited to the aforementioned embodiment, and may be any position on the inner peripheral surface of the first knob member 55.

(c) In the aforementioned embodiment, the example of the retaining structure shown retains the rear side of the first drag knob 50, 150, which serves to adjust the rear drag mechanism 45, 145 of a spinning reel. However, the reel in which the retaining structure is to be employed is not limited to the aforementioned embodiment, and may be applied in any type of reel so long as there is a brake adjustment knob.

Figure 15:
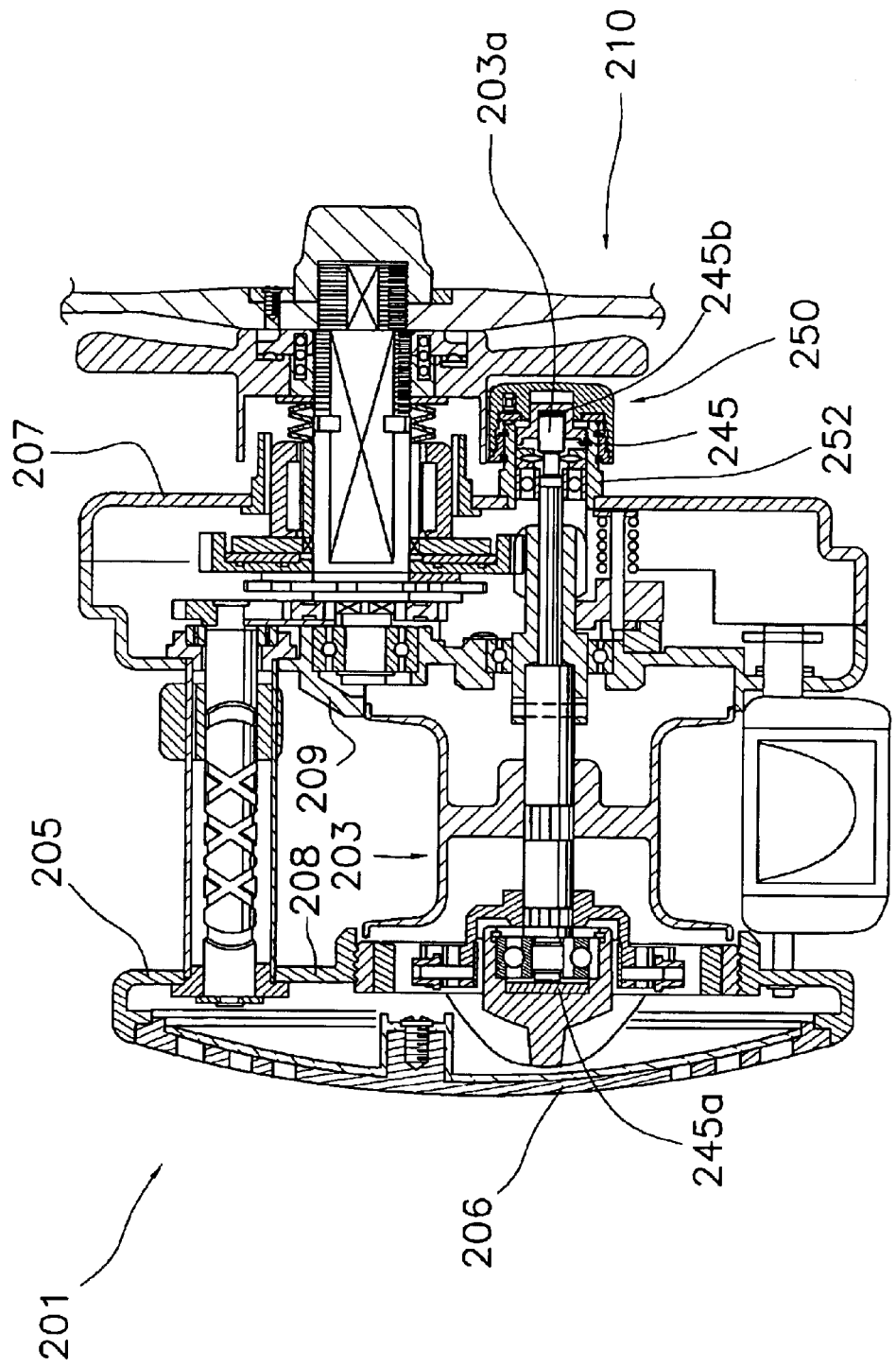
FIG. 15 is a cross sectional view of a dual bearing reel according to still another embodiment of the present invention.

For example, as shown in FIG. 15, the retaining structure can also be applied to a casting control knob 250 that is an adjustment member of a casting control mechanism 245 for a dual bearing reel.

The dual bearing reel primarily includes a reel unit 201, a handle 210 that is rotatively mounted to the reel unit 201, a spool 203 that is rotatively mounted on the reel unit 201 and braked by means of the casting control mechanism 245, and a casting control knob 250 that serves to adjust braking force of the casting control mechanism 245.

The reel unit 201 has a frame 205, and a first side cover 206 and a second side cover 207 that are mounted to both sides of the frame 205. The frame 205 includes a pair of side plates 208, 209 disposed such that they mutually face each other across a predetermined gap, and a plurality of connectors (not shown in the figures) that connect the side plates 208, 209. A knob mounting portion 252 that accommodates a rotational shaft end 203*a* of the spool 203 and a casting control mechanism 245 is arranged on the second side cover 207.

Figure 16:
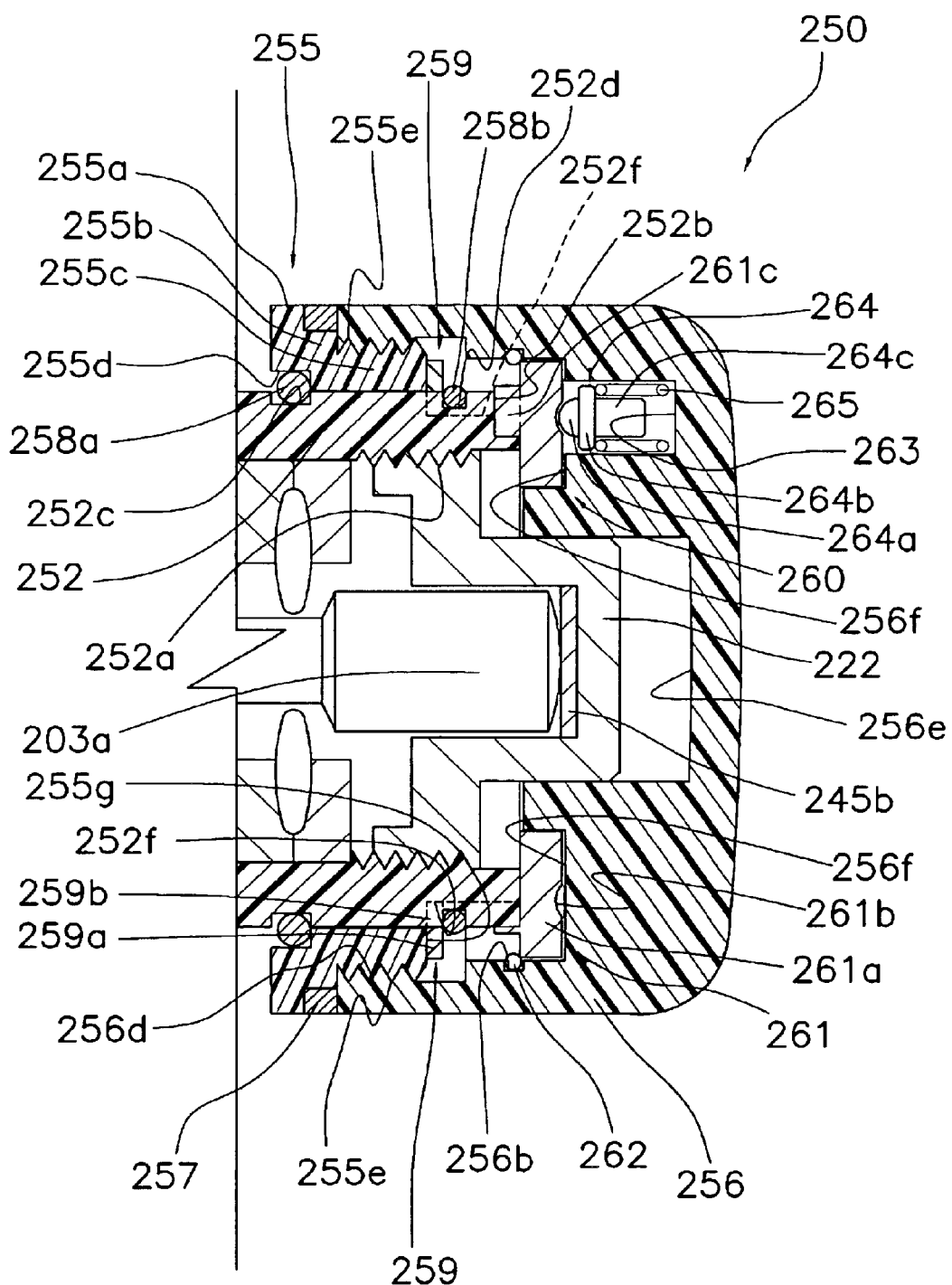
FIG. 16 is an enlarged cross sectional view of a casting control knob of the dual bearing reel according to the embodiment of FIG. 15.

As shown in FIG. 16, a plurality of first engagement recesses 252*b* are formed circumferentially apart by a predetermined distance on the front end surface of the knob mounting portion 252. In addition, a first female threaded portion 252*a* is formed in the front end portion of the inner peripheral surface of the knob mounting portion 252, and an annular first annular groove 252*c* and an annular second annular groove 252*d* are formed in a predetermined spaced relationship in the outer peripheral surface of the knob mounting portion 252. Then, second engagement recesses 252*f* are formed in the axial direction from the front end of the knob mounting portion 252 toward the second annular groove 252*d*. The second engagement recesses 252*f* are disposed in a predetermined spaced relationship in the circumferential direction, and the depths thereof are deeper than the depth of the second annular groove 252*d*.

As shown in FIGS. 15 and 16, the casting control mechanism 245 serves to adjust the resistance force during the rotation of the spool 203. The casting control mechanism 245 includes first and second pressure plates 245*a*, 245*b* that are disposed on both ends of the rotational shaft of the spool 203, a first pressure member 222 that is rotatively disposed on the inner peripheral portion of the knob mounting portion 252 in order to press the second pressure plate 245*b* inward, and a casting control knob 250 that is rotatively mounted on the knob mounting portion 252 and rotatively engages with the first pressure member 222. When the casting control knob 250 is rotated, the end of the rotational shaft of the spool 203 on the first pressure plate 245*a* side becomes a fulcrum, and the first pressure member 222 will both press the rotational shaft end 203*a* of the spool 203 in the axial direction via the second pressure plate 245*b* and release the pressure in the axial direction. In this way, the resistance force during the rotation of the spool 203 non-rotatively mounted on the rotational shaft is adjusted.

The casting control knob 250 includes first and second knob members 255, 256 and a ring member 257. The first knob member 255 is, for example, made of a synthetic resin, and is formed into a tubular shape. The first knob member 255 includes a first tubular portion 255*a*, a second tubular portion 255*b*, and a third tubular portion 255*c*, and the first to third tubular portions 255*a*, 255*b*, 255*c* are formed integrally with each other as a one-piece unitary unit.

An annular third annular groove 255*d* is arranged in the inner peripheral rim on the reel unit side of the first tubular portion 255*a*. A first engagement member 258*a* is fitted in between the third engagement groove 255*d* and the first annular groove 252*c* of the knob mounting portion 252. Here, for example, an O-ring is employed as the first engagement member 258*a*. The second tubular portion 255*b* is integrally formed with the rear end of the first tubular portion 255*a*, and the outer diameter of the second tubular portion 255*b* is smaller than the outer diameter of the first tubular portion 255*a*. The third tubular portion 255*c* is integrally formed with the rear end of the second tubular portion 255*b*, and the outer diameter of the third tubular portion 255*c* is smaller than the outer diameter of the second tubular portion 255*c*. In addition, a second male threaded portion 255*e* is arranged on the outer peripheral surface of the third tubular portion 255*c*.

A retaining engagement surface 255*g* is arranged on the rear end of the third tubular portion 255*c*. The retaining engagement surface 255*g* is formed in a planar shape that is substantially perpendicular to the rotational shaft of the spool 203. A washer 259 is disposed on the rear end of the retaining engagement surface 255*g*. The washer 259 includes a circular portion 259*a* and projections 259*b*. The circular portion 259*a* is brought into contact with the retaining engagement surface 255*g*. The projections 259*b* are formed so that they project inward from the inner peripheral surface of the circular portion 259*a* and can engage with the plurality of second engagement recesses 252*f*. The washer 259 is positioned by the second engagement member 258*b*. The second engagement member 258*b* is brought into contact with the washer 259 while being inserted into the second annular groove 252*d* that is formed in the knob mounting portion 252. Here, for example, a C-shaped retaining ring is employed as the second engagement member 258*b*, and the outer diameter of the second annular groove 252*d* is larger than the inner diameter of the circular portion 259*a* of the washer 259.

The second knob member 256 is, for example, made of a synthetic resin, and is formed into a closed-end tubular shape. First and second engagement portions 256*e*, 256*f* are provided on the closed end portion of the second knob member 256. The first engagement portion 256*e* is an oval-shaped hole formed at the central bottom portion of the closed-end portion of the second knob member 256. The first pressure member 222 is chamfered in parallel on the outer peripheral surface thereof and is engaged with the first engagement portion 256e. When this occurs, the first pressure member 222 is inside the first engagement portion 256e and capable of axially moving in and out therefrom but non-rotatively therewith. The second engagement portion 256f is formed in a toroidal recessed shape in the closed end portion of the second knob member 256. A sounding member 261 (described below) is engaged with the second engagement portion 256f. In addition, a first mounting recess 263 is formed in the bottom portion of the second engagement portion 256f that is formed in a toroidal recessed shape, and a first sounding pin 264 and a first coil spring (an example of the urging means) 265 (described below) are disposed in the first mounting recess 263.

A fourth annular groove 256b and a second female threaded portion 256d are arranged on the inner peripheral surface of the second knob member 256. The fourth annular groove 256b is formed on the closed end side of the second knob member 256, and has a diameter that is larger than the outer diameter of the sounding mechanism 261 described below. The second female threaded portion 256d is formed on the open side of the second knob member 256. The second knob member 256 is coupled to the first knob member 255 by screwing the second female threaded portion 256d together with the second male threaded portion 255e of the first knob member 255. When this occurs, the ring member 257 will be disposed between the first knob member 255 and the second knob member 256. The ring member 257 is, for example, made of aluminum. Note that the design of the casting control knob 250 can be improved by installing the ring member 257 between the first knob member 255 and the second knob member 256.

As shown in FIG. 16, a casting control sound generating mechanism 260 is disposed between the knob mounting portion 252 and the second knob member 256, and generates sound by relative rotation of the knob mounting portion 252 and the knob member 250. The casting control sound generating mechanism 260 includes a sounding member 261, a retaining member 262, a first mounting recess 263, a first sounding pin 264, and a first coil spring 265.

The sounding member 261 includes a disk portion 261a that is formed into a ring shape, a plurality of sounding concavities 261b that are disposed in a spaced relationship in the rotational direction in one surface of the disk portion 261a, and a plurality of engagement portions 261c that are integrally formed with another surface of the disk portion 261a. The disk portion 261a of the sounding member 261 is engaged with the second engagement portion 256f of the second knob member 256, and can rotate with respect to the second knob member 256. In addition, the outer diameter of the disk portion 261a is formed to be smaller than the inner diameter of the fourth annular groove 256b. The engagement portion 261c is formed to project toward the engagement recesses 252b formed in the right hand side end surface of the knob mounting portion 252, and can engage with the engagement recesses 252b. The retaining member 262 is arranged in order to prevent the sounding member 261 from falling out. The retaining member 262 is, for example, a C-shaped retaining ring, and is disposed in the fourth annular groove 256b. The inner diameter of the retaining member 262 is formed to be smaller than the outer diameter of the disk portion 261a, such that the retaining member 262 and the second engagement portion 256f sandwich the disk portion 261a. The first mounting recess 263 is formed in the closed end of the second knob member 256, in a position opposite the plurality of sounding concavities 261b.

The first sounding pin 264 is mounted in the first mounting recess so that it can move forward and backward, and engages with the first sounding concavities 261b of the sounding member 261. The first sounding pin 264 includes a first head portion 264a, a first mounting portion 264b that is integrally connected to the first head portion 264a, and a first shaft portion 264c that is integrally connected to the first mounting portion 264b. The first head portion 264a is formed such that the front end thereof is a smooth convex shape. The front end of the front head portion 264a generates a clicking sound by repeatedly striking the first sounding concavities 261b.

The first coil spring 265 is disposed on the outer periphery of the first shaft portion 264c of the first sounding pin 264. When this occurs, the base end of the first coil spring 265 is brought into contact with the bottom portion of the first mounting recess 263, and the front end of the first coil spring 265 is brought into contact with a step portion between the first mounting portion 264b and the first shaft portion 264c. The first coil spring 265 is accommodated in the first mounting recess 263 in the compressed state, and urges the first sounding pin 264 toward the first sounding concavities 261b.

With this type of retaining structure for the casting control knob 250 of a dual bearing reel, the circular portion 259a of the washer 259 is brought into contact with the retaining engagement surface 255g, and the projections 259b of the washer 259 are engaged with the plurality of second engagement recesses 252f formed in the knob mounting portion 252. Thus, when the washer 259 is situated, the washer 259 brought into contact with the retaining engagement surface 255g will regulate the rotation with respect to the knob mounting portion 252 even if the retaining engagement surface 255g rotates. Thus, because the retaining engagement surface 255g and the second engagement member 258b are disposed such that the washer 259 that is not rotative relative to the knob mounting portion 252 is interposed therebetween, the rotation of the retaining engagement surface 255g will not be transmitted to the second engagement member 258b by the washer 259 even if the retaining engagement surface 255g is rotated. This allows the posture of the second engagement member 258b to be stably maintained.

(d) In the aforementioned embodiments, a C-shaped retaining ring was employed as the second engagement members 58b, 158b, and 258b. However, the shape of the second engagement members 58b, 158b, 258b are not limited to those in the aforementioned embodiments, and may be anything so long as it can engage in the third engagement grooves 52d and the second annular grooves 152d, 252d of the knob mounting portions 52, 152, 252, and can restrict the falling off of the washers 59, 159, 259. For example, the same effects as when a C-shaped retaining ring is employed can be obtained even when an O-ring is employed as the second engagement members 58b, 158b, 258b.

(e) In the aforementioned embodiment, the ring members 57, 157, 257 are disposed between the first knob member 55, 155, 255 and the second knob member 56, 156, 256. However, the presence or absence of the ring members 57, 157, 257 is not limited to the structures shown in the aforementioned embodiments, and it is not necessary to employ a ring member. For example, if a ring member is not employed, even though it will be difficult to improve the design of the brake adjustment knob, the same effects as when the ring member 57, 157, or 257 were employed can be obtained in that the brake adjustment knobs can be retained within the retaining structures.

(f) In the aforementioned second embodiment, the second mounting recess 172 of the second rear drag sound generating mechanism 170 is formed on the outer peripheral side surface of the knob mounting portion 152. However, the position in which the second mounting recess 172 is disposed is not limited to the aforementioned embodiment, and may be disposed in any location so long as the second sounding pin 173 can engage with the second sounding concavities 171.

(g) In the aforementioned second embodiment, the second sounding concavities 171 are formed in groove shapes that extend in the axial direction. However, the shape of the second sounding concavities 171 is not limited to that of the aforementioned embodiment, and the second sounding concavities 171 may be formed in any shape so long as the second sounding pin 173 can engage with the second sounding concavities 171.

(h) In the aforementioned second embodiment, the second sounding concavities 171 are formed in the inner peripheral side surface of the second drag knob 151. However, the position in which the second sounding concavities 171 are disposed is not limited to that of the aforementioned embodiment, and the second sounding concavities 171 may be disposed in any location so long as the second sounding pin 173 can engage with the second sounding concavities 171.

In the aforementioned second embodiment, the second sounding pin 173 and the second coil spring 174 are placed in the second mounting recess 172 formed on the outer peripheral side of the knob mounting portion 152, and the second sounding concavities 171 are formed on the inner peripheral side surface of the second drag knob 151. In this way, when the second drag knob 151 is pivoted, the second sounding pin 173 repeatedly strikes the second sounding concavities 171 to generate sounds. When this occurs, the good clear clicking sounds and modulated clicking feeling can be obtained. So long as these effects can be obtained, the position in which the second sounding concavities 171, the second mounting recess 172, the second sounding pin 173, and the second coil spring 174 are disposed is not limited to those of the aforementioned embodiment. The second sounding concavities 171, the second mounting recess 172, the second sounding pin 173, and the second coil spring 174 may be disposed in any location. For example, the second mounting recess 172 can be formed on the inner peripheral side surface of the second drag knob 151, and the second sounding pin 173 and the second coil spring 174 can be placed in the second mounting recess 172. Alternatively, the second sounding concavities 171 can be formed on the outer peripheral side of the knob mounting portion 152. Even if the second sounding concavities 171, the second mounting recess 172, the second sounding pin 173, and the second coil spring 174 are disposed in this way, the second sounding pin 173 repeatedly strikes the second sounding concavities 171 to generate sounds as the second drag knob 151 is pivoted. With such structure, good clear clicking sounds and modulated clicking feeling can be obtained.

According to the present invention, in a sound generating mechanism of a fishing reel, good crisp clicking sounds can be obtained when a knob member is rotated because a sounding pin mounted in a mounting recess of the knob member is engaged with sounding concavities of a sounding member by an urging means. In addition, because the sounding member is mounted to the knob member in a state in which the sounding pin is engaged with one of the sounding concavities of the sounding member, and the sounding member is retained by a retaining member, it will be difficult for the sounding member and the urging means to fall out from the knob member regardless of the posture of the knob member when one attempts to mount the knob member to a knob mounting portion. Furthermore, even when one attempts to remove the knob member from the knob mounting portion, it will be difficult for the sounding pin to fall out from the knob member because the sounding member retained by the retaining member restricts the removal of the sounding pin from the knob member.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-111447, 2003-137379, and 2003-154603. The entire disclosures of Japanese Patent Applications Nos. 2003-111447, 2003-137379, and 2003-154603 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sound generating mechanism for a fishing reel that is disposed between a tubular knob mounting portion that is arranged on a reel unit of the fishing reel and a closed end tubular knob member that is rotatively mounted on the knob mounting portion, the sound generating mechanism generating sounds by a relative rotation between the knob mounting portion and the knob member and comprising:

a sounding member adapted to be rotatively mounted to an engagement portion of the knob member and be non-rotative with respect to the knob mounting portion, the sounding member having a disk portion that is formed into a ring shape and a plurality of sounding concavities that are formed circumferentially apart on the disk portion;

a retaining member adapted to be mounted to the knob member such that the sounding member is sandwiched between the retaining member and the engagement portion of the knob member;

a sounding pin that is mounted to the engagement portion of the knob member at a position opposite at least one of the plurality of sounding concavities, the sounding pin being mounted so as to be movable toward and away from the plurality of sounding concavities; and urging means mounted to the engagement portion of the knob member for urging the sounding pin toward the plurality of sounding concavities.

2. The sound generating mechanism as set forth in claim 1, wherein the sounding pin and the urging means are adapted to be mounted in a mounting recess formed on the engagement portion of the knob member.

3. The sound generating mechanism as set forth in claim 1, wherein the sounding pin has a convex head portion, a mounting portion that is connected to the head portion and has a diameter that is larger than a diameter of the head portion, and a shaft portion that is connected to the mounting portion and has a diameter that is smaller than the diameter of the mounting portion.

4. The sound generating mechanism as set forth in claim 1, wherein the retaining member is adapted to be mounted on an inner peripheral surface of the knob member.

5. The sound generating mechanism as set forth in claim 1, wherein the retaining member is mounted in an annular engagement groove that has a diameter larger than an outer diameter of the sounding member and is formed in the inner peripheral surface of the knob member.

6. The sound generating mechanism as set forth in claim 1, wherein the retaining member is a C-shaped retaining ring, and an inner diameter of the C-shaped retaining ring is smaller than an outer diameter of the sounding member.

7. The sound generating mechanism as set forth in claim 1, wherein a plurality of engagement recesses are formed circumferentially apart in the knob mounting member, and the sounding member has a plurality of protruding portions that are integrally formed on the disk portion and project toward the engagement recesses of the knob mounting member, the plurality of protruding portions non-rotatively engaging with the engagement recesses of the knob mounting member.

8. The sound generating mechanism as set forth in claim 1, wherein the urging means includes a coil spring that is disposed around an outer periphery of the sounding pin.

9. The sound generating mechanism as set forth in claim 8, wherein an end portion of the coil spring is engaged with a bottom portion of a mounting recess formed on the engagement portion of the knob member.

10. A fishing reel, comprising:

a reel unit that rotatively supports a handle;

a spool around an outer peripheral surface of which fishing line is wound as the handle rotates;

a tubular knob mounting portion arranged on the reel unit;

a closed end tubular knob member that is rotatively mounted on the knob mounting portion; and a sound generating mechanism disposed between the knob member and the knob mounting portion for generating sounds by a relative rotation between the knob mounting portion and the knob member, the sound generating mechanism including:

a sounding member that is rotatively mounted to an engagement portion of the knob member and is non-rotative with respect to the knob mounting portion, the sounding member having a disk portion that is formed into a ring shape and a plurality of sounding concavities that are circumferentially apart formed on the disk portion;

a retaining member that is mounted to the knob member such that the sounding member is sandwiched between the retaining member and the engagement portion of the knob member;

a sounding pin that is mounted to the engagement portion of the knob member at a position opposite from at least one of the plurality of sounding concavities, the sounding pin being mounted so as to be movable toward and away from the plurality of sounding concavities; and urging means mounted to the engagement portion of the knob member for urging the sounding pin toward the plurality of sounding concavities.

11. The fishing reel as set forth in claim 10, wherein the sounding pin and the urging means are adapted to be mounted in a mounting recess formed on the engagement portion of the knob member.

12. The fishing reel as set forth in claim 10, wherein the sounding pin has a convex head portion, a mounting portion that is connected to the head portion and has a diameter that is larger than a diameter of the head portion, and a shaft portion that is connected to the mounting portion and has a diameter that is smaller than the diameter of the mounting portion.

13. The fishing reel as set forth in claim 10, wherein the retaining member is mounted on an inner peripheral surface of the knob member.

14. The fishing reel as set forth in claim 10, wherein the retaining member is mounted in an annular engagement groove that has a diameter larger than an outer diameter of the sounding member and is formed in the inner peripheral surface of the knob member.

15. The fishing reel as set forth in claim 10, wherein the retaining member is a C-shaped retaining ring, and an inner diameter of the C-shaped retaining ring is smaller than an outer diameter of the sounding member.

16. The fishing reel as set forth in claim 10, wherein a plurality of engagement recesses are formed circumferentially apart in the knob mounting member, and the sounding member has a plurality of protruding portions that are integrally formed on the disk portion and project toward the engagement recesses of the knob mounting member, the plurality of protruding portions non-rotatively engaging with the engagement recesses of the knob mounting member.

17. The fishing reel as set forth in claim 10, wherein the urging means includes a coil spring that is disposed around an outer periphery of the sounding pin.

18. The fishing reel as set forth in claim 17, wherein a mounting recess is formed on a bottom portion of the engagement portion of the knob member, and an end portion of the coil spring is engaged with the mounting recess.

19. The fishing reel as set forth in claim 10, wherein the fishing reel is a spinning reel that has a drag mechanism, the knob mounting portion is arranged on a rear portion of the reel unit and accommodates the rear drag mechanism, and drag of the drag mechanism is adjusted when the knob member rotates relative to the knob mounting portion.

20. The fishing reel as set forth in claim 10, wherein the fishing reel is a dual bearing reel that has a casting control mechanism for braking the spool, the reel unit includes a frame and two side covers that are mounted to both sides of the frame, the knob mounting portion that accommodates the casting control mechanism is arranged to project from one of the side covers of the reel unit, and breaking force of the casting control mechanism is adjusted when the knob member rotates relative to the knob mounting portion.

* * * * *